US009801392B2

(12) United States Patent
Erickson et al.

(10) Patent No.: US 9,801,392 B2
(45) Date of Patent: Oct. 31, 2017

(54) FAT PARTICLE COMPOSITIONS CONTAINING SALT, DOUGH AND BAKED DOUGH ARTICLES MADE THEREFROM, AND RELATED METHODS

(71) Applicant: GENERAL MILLS, INC., Minneapolis, MN (US)

(72) Inventors: Braden J. Erickson, Eden Prairie, MN (US); Alan A. Oppenheimer, Savage, MN (US); Jon Duke Seibold, Mahtomedi, MN (US); Wenyi Wang, Blaine, MN (US)

(73) Assignee: General Mills, Inc., Minneapolis, MN (US)

( * ) Notice: Subject to any disclaimer, the term of this patent is extended or adjusted under 35 U.S.C. 154(b) by 64 days.

(21) Appl. No.: 14/396,168

(22) PCT Filed: Mar. 22, 2013

(86) PCT No.: PCT/US2013/033532
§ 371 (c)(1),
(2) Date: Oct. 22, 2014

(87) PCT Pub. No.: WO2013/162802
PCT Pub. Date: Oct. 31, 2013

(65) Prior Publication Data
US 2015/0050412 A1    Feb. 19, 2015

Related U.S. Application Data

(60) Provisional application No. 61/639,542, filed on Apr. 27, 2012.

(51) Int. Cl.
*A21D 10/00* (2006.01)
*A21D 2/02* (2006.01)
(Continued)

(52) U.S. Cl.
CPC ............ *A21D 10/005* (2013.01); *A21D 2/02* (2013.01); *A21D 2/165* (2013.01); *A21D 8/06* (2013.01); *A23D 7/0053* (2013.01)

(58) Field of Classification Search
CPC ....... A21D 10/005; A21D 8/06; A23D 7/0053
See application file for complete search history.

(56) References Cited

U.S. PATENT DOCUMENTS 3,714,210 A    1/1973  Schweiger et al.
3,800,056 A    3/1974  Mitchell, Jr.
(Continued)

FOREIGN PATENT DOCUMENTS

EP    1197153    2/2005
GB    855349     11/1960
(Continued)

OTHER PUBLICATIONS

"ADM Product Code 106-150", Technical Data Sheet, ADM—Packaged Oils, p. 1.
"Determination of Solid Fat Content in Edible Oils and Fats by the Official Direct Method (AOCS Cd 16b-93)", Application Note 13, Part No. SFC:10-09, Oxford Instruments, pp. 2.
"Dritex S Flakes", Product Data Sheet, ACH Food Companies, Inc. pp. 2 (Oct. 9, 2007).
(Continued)

*Primary Examiner* — D Lawrence Tarazano
*Assistant Examiner* — Stephanie Cox
(74) *Attorney, Agent, or Firm* — Rachel A. Kahler; John L. Crimmins, Esq.; Diederiks & Whitelaw, PLC

(57) ABSTRACT

Fat particles useful in food compositions as doughs, methods of preparing the fat particles, method of preparing the food compositions (e.g., doughs) that contain the fat particles, and methods of preparing a baked food product from the food composition, wherein the fat particles contain flavorant salt. These fat particle can be used to prepare dough formulations that meet the desire of being more healthful than previous dough formulations due to a reduced sodium content, optional more healthful fat content (e.g., low trans fats or low saturated fats), or both. Additionally,
(Continued)

the fat particles can be conveniently used in commercial or consumer scale dough processing.

15 Claims, 9 Drawing Sheets

(51) Int. Cl.
  *A21D 2/16* (2006.01)
  *A21D 8/06* (2006.01)
  *A23D 7/005* (2006.01)

(56) References Cited

U.S. PATENT DOCUMENTS

| | | | |
|---|---|---|---|
| 3,859,445 A | 1/1975 | Langhans |
| 3,859,447 A | 1/1975 | Sreenivasan |
| 3,867,556 A | 2/1975 | Darragh et al. |
| 3,950,561 A | 4/1976 | Collins |
| 3,985,911 A | 10/1976 | Kriz et al. |
| 4,018,755 A | 4/1977 | Wang |
| RE30,086 E | 8/1979 | Carlile et al. |
| 4,211,800 A | 7/1980 | Scharschmidt et al. |
| 4,268,534 A | 5/1981 | Kawada et al. |
| 4,390,561 A | 6/1983 | Blair et al. |
| 4,447,462 A | 5/1984 | Tafuri et al. |
| 4,590,086 A | 5/1986 | Takahashi et al. |
| 4,810,513 A | 3/1989 | Van Liere |
| 4,839,187 A | 6/1989 | Mai et al. |
| 4,883,684 A | 11/1989 | Yang |
| 4,891,233 A | 1/1990 | Belanger et al. |
| 5,064,677 A | 11/1991 | Cain et al. |
| 5,147,670 A | 9/1992 | Cebula et al. |
| 5,190,868 A | 3/1993 | Kokusho et al. |
| 5,215,779 A | 6/1993 | Dake et al. |
| 5,302,408 A | 4/1994 | Cain et al. |
| 5,306,516 A | 4/1994 | Letton et al. |
| 5,407,695 A | 4/1995 | Wheeler et al. |
| 5,431,948 A | 7/1995 | Cain et al. |
| 5,472,728 A | 12/1995 | Miller et al. |
| 5,578,334 A | 11/1996 | Sundram et al. |
| 5,587,195 A | 12/1996 | Sassen |
| 5,612,080 A | 3/1997 | Gruetzmacher et al. |
| 5,667,837 A | 9/1997 | Broomhead et al. |
| 5,683,738 A | 11/1997 | Gruetzmacher et al. |
| 5,686,131 A | 11/1997 | Sato et al. |
| 5,710,365 A | 1/1998 | Kerr et al. |
| 5,756,142 A | 5/1998 | Reckweg et al. |
| 5,843,497 A | 12/1998 | Sundram et al. |
| 5,866,187 A | 2/1999 | Kines |
| 5,874,117 A | 2/1999 | Sundram et al. |
| 5,908,655 A | 6/1999 | Doucet |
| 5,989,618 A | 11/1999 | Thurman et al. |
| 6,013,255 A | 1/2000 | Edens et al. |
| 6,022,577 A | 2/2000 | Chrysam et al. |
| 6,022,578 A | 2/2000 | Miller |
| 6,033,703 A | 3/2000 | Roberts et al. |
| 6,033,710 A | 3/2000 | Miller et al. |
| 6,068,876 A | 5/2000 | Miller et al. |
| 6,106,885 A | 8/2000 | Huizinga et al. |
| 6,156,370 A | 12/2000 | Huizinga et al. |
| 6,162,483 A | 12/2000 | Wester |
| 6,228,417 B1 | 5/2001 | Hidaka et al. |
| 6,231,914 B1 | 5/2001 | Huizinga et al. |
| 6,238,723 B1 | 5/2001 | Sassen et al. |
| 6,277,433 B1 | 8/2001 | Lantz et al. |
| 6,312,751 B1 | 11/2001 | Cain et al. |
| 6,312,752 B1 | 11/2001 | Lansbergen et al. |
| 6,322,842 B1 | 11/2001 | Reddy et al. |
| 6,406,737 B1 | 6/2002 | Cain et al. |
| 6,423,363 B1 | 7/2002 | Traska et al. |
| 6,517,884 B1 | 2/2003 | Bauer-Plank et al. |
| 6,544,579 B1 | 4/2003 | Landon |
| 6,630,172 B2 | 10/2003 | Batarseh |
| 6,649,202 B1 | 11/2003 | Huxel |
| 6,777,018 B2 | 8/2004 | Floeter et al. |
| 6,863,915 B2 | 3/2005 | Huxel |
| 6,929,816 B2 | 8/2005 | Wester |
| 7,105,195 B2 | 9/2006 | Plank et al. |
| 7,108,888 B2 | 9/2006 | Floeter |
| 7,118,773 B2 | 10/2006 | Floeter et al. |
| 7,223,435 B2 | 5/2007 | Besselink et al. |
| 7,229,653 B2 | 6/2007 | Sundram et al. |
| 7,247,335 B2 | 7/2007 | Floter |
| 7,498,453 B2 | 3/2009 | Van Toor et al. |
| 7,524,524 B2 | 4/2009 | Floeter |
| 7,547,459 B2 | 6/2009 | Plank et al. |
| 8,435,592 B2 | 5/2013 | Erickson et al. |
| 8,518,470 B2 | 8/2013 | Erickson et al. |
| 2002/0071896 A1 | 6/2002 | Palmer et al. |
| 2002/0114874 A1 | 8/2002 | Floeter et al. |
| 2002/0119240 A1 | 8/2002 | Mazurek et al. |
| 2002/0142072 A1 | 10/2002 | Huxel |
| 2002/0176923 A1* | 11/2002 | Cain ............... A21D 2/02 426/601 |
| 2003/0082289 A1 | 5/2003 | Huxel |
| 2003/0113427 A1 | 6/2003 | Floeter et al. |
| 2003/0161934 A1 | 8/2003 | Floter |
| 2003/0161935 A1 | 8/2003 | Kakuda et al. |
| 2003/0175402 A1 | 9/2003 | Wester |
| 2003/0175403 A1 | 9/2003 | Gurin |
| 2004/0028622 A1 | 2/2004 | Gurin |
| 2004/1004796 | 3/2004 | Wester et al. |
| 2004/0071856 A1 | 4/2004 | Floeter |
| 2004/0071857 A1 | 4/2004 | Besselink et al. |
| 2004/0197463 A1 | 10/2004 | Gottemoller |
| 2004/0219277 A1 | 11/2004 | Wester |
| 2005/0042332 A1 | 2/2005 | Lonergan |
| 2005/0123668 A1 | 6/2005 | Kodali et al. |
| 2005/0136167 A1 | 6/2005 | Kraklow et al. |
| 2005/0220965 A1 | 10/2005 | Floeter |
| 2005/0233056 A1 | 10/2005 | Jahaniaval |
| 2005/0249855 A1 | 11/2005 | Marangoni et al. |
| 2005/0249856 A1 | 11/2005 | Marangoni et al. |
| 2005/0276900 A1 | 12/2005 | Ullanoormadam |
| 2006/0013934 A1 | 1/2006 | Villagran et al. |
| 2006/0019021 A1 | 1/2006 | Plank et al. |
| 2006/0058401 A1 | 3/2006 | Ishikawa et al. |
| 2006/0105092 A1 | 5/2006 | Miller |
| 2006/0280855 A1 | 12/2006 | Van Den Berg et al. |
| 2006/0286272 A1 | 12/2006 | Hanselmann |
| 2006/0292276 A1 | 12/2006 | Huxel et al. |
| 2007/0071875 A1 | 3/2007 | Wester |
| 2007/0128340 A1 | 6/2007 | Andrews et al. |
| 2007/0160739 A1 | 7/2007 | Kuwabara et al. |
| 2007/0178218 A1 | 8/2007 | Yager et al. |
| 2007/0185340 A1 | 8/2007 | Van Toor et al. |
| 2007/0190186 A1 | 8/2007 | Loh et al. |
| 2007/0243308 A1 | 10/2007 | Yu et al. |
| 2008/0063782 A1* | 3/2008 | Cottrell ............ A21D 2/16 426/607 |
| 2008/0118624 A1 | 5/2008 | Boer et al. |
| 2008/0175958 A1 | 7/2008 | Staeger et al. |
| 2008/0206413 A1 | 8/2008 | Fine et al. |
| 2008/0268130 A1 | 10/2008 | Bons et al. |
| 2009/0029024 A1 | 1/2009 | McNeill et al. |
| 2009/0029025 A1 | 1/2009 | Pernetti |
| 2009/0047409 A1 | 2/2009 | Schreiber et al. |
| 2009/0047434 A1 | 2/2009 | Trophardy |
| 2009/0123619 A1 | 5/2009 | Narine et al. |
| 2009/0136645 A1 | 5/2009 | Garbolino et al. |
| 2009/0142467 A1 | 6/2009 | Aldred et al. |
| 2009/0220653 A1 | 9/2009 | Doucet |
| 2009/0238906 A1 | 9/2009 | Ikeda et al. |
| 2009/0311387 A1 | 12/2009 | Plank et al. |
| 2011/0020520 A1 | 1/2011 | Van Lengerich et al. |
| 2011/0097471 A1 | 4/2011 | Arlinghaus |
| 2012/0064193 A1 | 3/2012 | Erickson et al. |
| 2012/0064195 A1 | 3/2012 | Erickson et al. |
| 2012/0308708 A1 | 12/2012 | Seibold et al. |

FOREIGN PATENT DOCUMENTS

| | | |
|---|---|---|
| GB | 1005804 | 9/1965 |
| GB | 2081293 | 2/1982 |

(56) References Cited

FOREIGN PATENT DOCUMENTS

| | | |
|---|---|---|
| GB | 2210544 | 6/1986 |
| GB | 2176143 | 12/1986 |
| JP | 60145055 | 7/1985 |
| JP | 61001343 | 1/1986 |
| JP | 61095098 | 5/1986 |
| JP | 62273293 | 11/1987 |
| JP | 7313086 | 12/1995 |
| JP | 2000102345 | 4/2004 |
| JP | 2007174988 | 7/2007 |
| JP | 2007252203 | 10/2007 |
| JP | 2007282606 | 11/2007 |
| JP | 2008220290 | 9/2008 |
| JP | 2008263790 | 11/2008 |
| JP | 2008278833 | 11/2008 |
| JP | 2009072096 | 4/2009 |
| WO | WO-92/15200 | 9/1992 |
| WO | WO-03/080779 | 10/2003 |
| WO | WO-2004/108874 | 12/2004 |
| WO | WO-2005/012471 | 2/2005 |
| WO | WO-2006/014322 | 2/2006 |
| WO | WO-2006/133124 | 12/2006 |
| WO | WO-2007/061372 | 5/2007 |
| WO | WO-2009/130928 | 10/2009 |
| WO | WO-2010/007802 | 1/2010 |

OTHER PUBLICATIONS

"Dropping Point", Sampling and Analysis of Commercial Fats and Oils, AOCS Official Method Cc 18-80, Reapproved 1997, Revised 2001, pp. 1-2.

"Solid Fat Content (SFC) by Low-Resolution Nucelar Magnetic Resonance—The Direct Method", Sampling and Analysis of Commercial Fats and Oils, AOCS Official Method Cd 16b-93, Revised 1991, pp. 1-10.

Latondress, E. G., "Formulation of Products from Soybean Oil" JAOCS 58:185 (1981).

List, G. R. "Effect of Interesterification on X-Ray Diffraction Patterns of Soy-Soy Trisaturate Blends", JAOCS 54(10) 412.

List, G.R. et al. "Margarine and Shortening Oils by Interesterification of Liquid and Trisaturated Triglycerides" JAOCS 72(3) 379 (1995).

Louis H. Going, "Interesterification Products and Processes", JOACS, Sep. 1967, vol. 41, 414A.

Petrauskaite et al. "Physical and Chemical Properties of trans-Free Fats Producted by Chemical Interesterification of Vegetable Oil Blends", JAOCS 75(4) 489 (1998).

Wiedermann "Margarine and Margarine Oil, Formulation and Control", JAOCS 55:823 (1978).

* cited by examiner

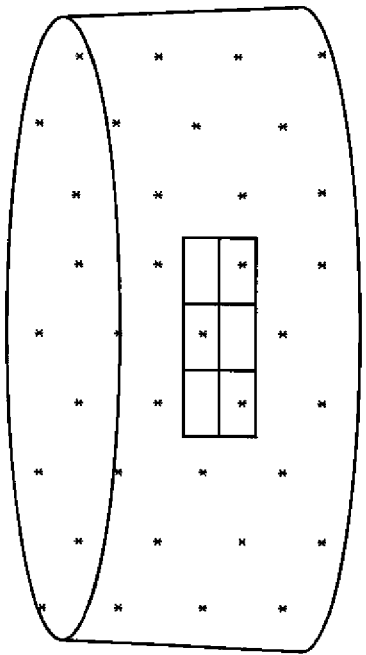
Fig. 2A CONTROL BISCUIT
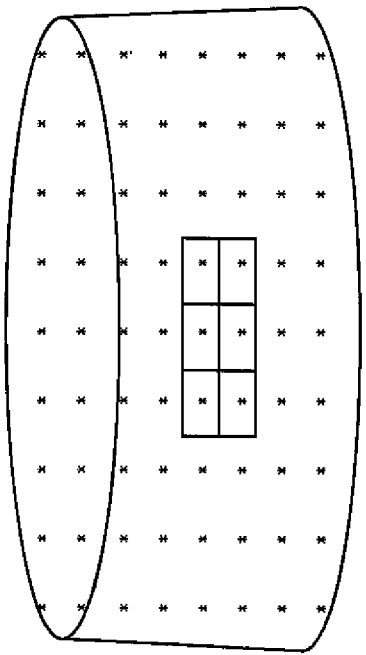
Fig. 2B REDUCED SALT BISCUIT
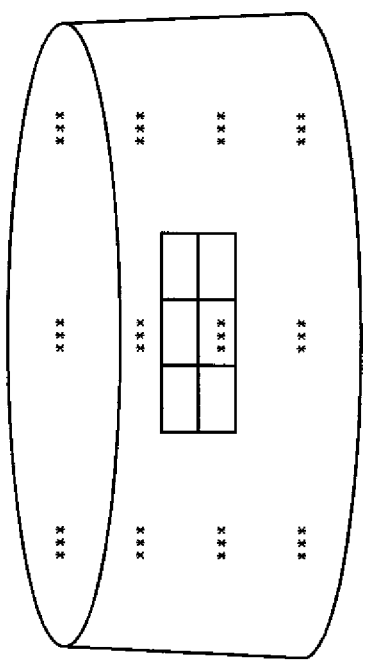
Fig. 2C INVENTION

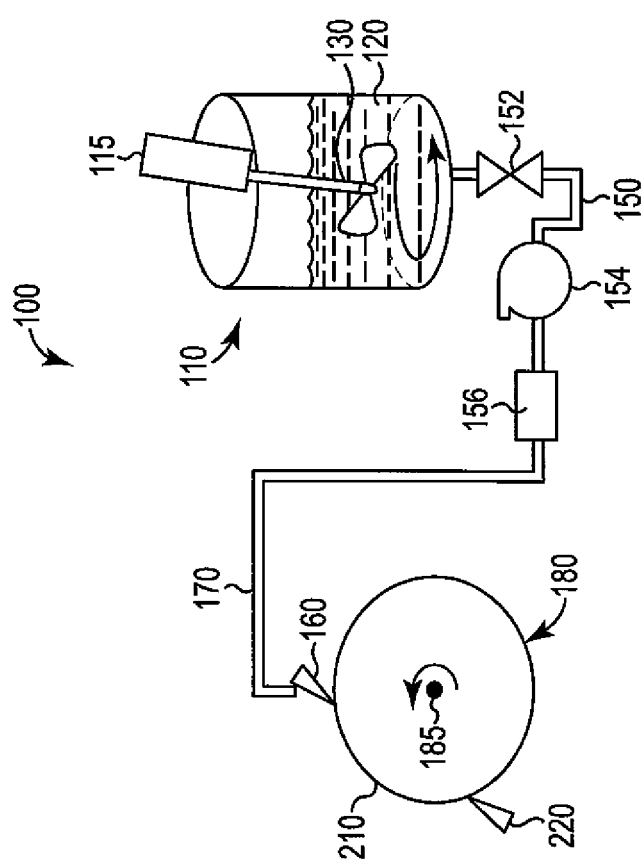

//FAT PARTICLE COMPOSITIONS CONTAINING SALT, DOUGH AND BAKED DOUGH ARTICLES MADE THEREFROM, AND RELATED METHODS

PRIORITY

The present non-provisional patent Application is a U.S. National Stage of International Application Serial No.: PCT/US2013/033532, filed Mar. 22, 2013, which claims priority under 35 USC §119(e) from U.S. Provisional Patent Application having Ser. No. 61/639,542, filed Apr. 27, 2012, entitled "FAT PARTICLE COMPOSITIONS CONTAINING SALT, DOUGH AND BAKED DOUGH ARTICLES MADE THEREFROM, AND RELATED METHODS," the entirety of which is incorporated herein by reference.

FIELD OF THE INVENTION

The invention relates to fat particles that contain flavorant salt, compositions of multiple or very large numbers of such fat particles, food products such as raw and baked dough products prepared using the fat particles and fat particle compositions, and related methods of making the fat particles, fat particle compositions, and food products.

BACKGROUND

Dough compositions that are suitable for use in dough or bakery products such as biscuits, pie doughs, pizza crusts, and sweet rolls, etc., commonly contain fat, water, flour, leavening agent (e.g., yeast), and salt as a flavorant.

These days, consumers, regulators, and food companies desire to lower total sodium content in food products. A common way to reduce total sodium used is to replace sodium salt that is used in dough product as a flavorant, with a potassium or calcium salt "salt substitute." This substitution usually leads to a significant ingredient cost increase. Also, due to bitterness and metallic taste, potassium salt can only be used up to certain levels. Novel cost effective low sodium solutions are still needed.

Another health-sensitive ingredient is the fat. Fats typically used in these types of dough products are triglyceride-based fats that commonly contain a fairly high level of saturated fats and trans fatty acids. Due to a present trend toward healthier dough and bakery products, there is demand for products that contain healthier fats (i.e., having a reduced amount of saturated fats and trans fatty acids) without sacrificing taste and baking performance of the dough. In view of the foregoing, alternative fat compositions that are low in saturated and trans fatty acids are very desirable, especially if they can also be used in low sodium products.

In preparing dough products, especially on a commercial scale, companies look for ingredients that can be conveniently handled and processed. Shortening chips (particles, flakes, etc., also referred to herein as "fat particles") fit this bill nicely because they take the form of solid particles that can be conveniently handled, stored, and processed. Shortening chips that are even more convenient, and that can result in more healthful dough products, such as products having reduced sodium, healthful fat types, or both, are always desirable.

SUMMARY

The described invention provides fat particles that contain, consist of, or consist essentially of fat (e.g., fat ingredient), salt as a flavorant (flavorant salt), and optionally water. These fat particle can be used to prepare dough formulations that meet the desire of being more healthful than previous dough formulations due to a reduced sodium content, optional more healthful fat content (e.g., low trans fats or low saturated fats), or both. Additionally, the fat particles can be conveniently used in commercial or consumer scale dough processing.

More generally, embodiments of fat particles, dough compositions, and methods described herein contain novel and cost effective solutions to reduce sodium in a baked dough product by producing the baked dough product to have uneven flavorant salt distribution. The uneven distribution results from the use of fat particles that contain flavorant salt. The fat particles can be used to deliver and distribute flavorant salt in a food product such as a dough product. The result is uneven concentration of the flavorant salt throughout the food product, resulting in local spike (relatively high) concentrations of saltiness. Advantageously, the locally increased flavorant salt concentrations can allow for a lower total salt content of the food product, e.g., baked dough product, while maintaining a salt flavor level that is similar to an otherwise similar baked dough product having a higher concentration of flavorant salt that is more evenly distributed throughout the baked dough product.

Without being bound by any theory of operation, locally high salt concentrations within a baked dough product have been found to be a driving factor of overall salty flavor of a baked dough product, rather than just the total amount of flavorant salt present in the baked dough product. When flavorant salt is distributed unevenly in a baked dough product, with relatively high local concentrations, a lower total amount of flavorant salt is required to obtain a salt flavor that compares closely to a higher amount of total salt distributed more evenly (e.g., uniformly) throughout an otherwise similar baked dough product. At the same time, it is also possible that placing salt at a high local concentration of fat within a baked dough product can improve taste perception of the salt. Placement of a high local concentration of salt, in a high local concentration of fat, in a baked dough product, is not typical. When a person eats a baked dough product that includes a high local concentration of flavorant salt, the effect can be increased or outsized perception of the salt (relative to the total amount of salt in the dough product), because the high local concentration of flavorant salt provides for efficient taste effect. The common belief is that salt needs to be dissolved in saliva to be effectively tasted, and faster dissolution is associated with stronger saltiness perception. Fat, being hydrophobic, is sometimes considered to be a natural barrier that prevents salt from dissolving in water or saliva. It is surprising that, as described herein, delivering salt in fat particles can enhance saltiness sensation in a final cooked food product, rather than masking saltiness. This, without being bound by any theory, may be due to a combination of surface salt coating, and controlled high local salt concentration in the bulk of the food product, simultaneously delivered to a consumer in a unique manner by the flavorant salt-containing fat particles, upon cooking and melting.

The described fat and dough composition, and methods, can provide for relatively high local salt concentrations in an environment of fat, in a baked dough product, allowing for lower total flavorant salt levels in the baked dough product, but still providing salty flavor that is comparable to otherwise similar baked dough products having a higher total amount of flavorant salt that is more evenly distributed.

Further, embodiments of fat particles and dough products can place local relatively high salt concentration in a controlled manner, to avoid unexpected excess concentrations of flavorant salt in the product that could cause undesirable taste.

Fat particles include a solid fat (solid fat phase). Suspended or distributed within the solid fat can be optional water particulates or water droplets. Also optionally suspended throughout the solid fat, or concentrated at a surface, can be flavorant salt as solid particles. Alternately or in addition to flavorant salt particles suspended or distributed as solid particles within the solid fat or at a surface, flavorant salt may be dissolved in the water of the optional water droplets dispersed in the solid fat phase.

The composition of the solid fat, or solid fat phase (not including suspended water droplets or flavorant salt particles) is mainly or entirely a fat ingredient, a fat substitute, or a combination of fat ingredient and fat substitute. The fat ingredient can be any known or future-developed fat ingredient useful to form fat particles. Examples of specific fat ingredients include base oils, many of which are known, and processed base oils, which are derived from base oils, e.g., by interesterification, fractionation, or hydrogenation of a base oil. The solid fat can in certain embodiments comprise, consist of, or consist essentially of any one or a combination of such fat ingredients, i.e., base oil, interesterified base oil, fractionated base oil, partially hydrogenated base oil, fully hydrogenated base oil, or combination of these. Optionally along with the fat ingredient or fat substitute, a solid fat phase can include other added ingredients such as emulsifier, hydrocolloid, or preservative, in minor and relatively low amounts, e.g., each of these ingredients may be present in an amount of less than two percent or less than one percent, per ingredient, based on total weight fat particle.

The invention involves using fat particles as vehicles to deliver flavorant salt in a food product, e.g., dough product such as a biscuit. The fat particles can contain a desired amount of flavorant salt, such as up to about 50 percent by weight flavorant salt based on the total weight of the flavorant salt-containing fat particles. The fat particles can be included in a food product such as a biscuit dough or other dough product intended for cooking (e.g., baking). Upon baking, fat particles melt and salt is released into the dough composition at the location of the fat particles, creating a locally high salt concentration. The flavorant salt can be contained in the fat particles as flavorant salt particles suspended uniformly throughout the fat particle, or concentrated at a surface of fat particles. Alternately or additionally, flavorant salt can be dissolved in water and the water can be suspended as water droplets within hydrated fat particles that are in the form of a water-in-fat emulsion.

According to certain embodiments of food products, partitioning flavorant salt by creating non-uniform localized high concentrations of the flavorant salt within a baked dough product has been found to significantly increase the perception of saltiness of the baked dough product, for the amount of flavorant salt included in the baked dough product. In some embodiments, the total amount of flavorant salt (e.g., sodium chloride) used in a baked dough product might by reduced be roughly fifty percent, with the reduced amount of salt (unevenly distributed throughout the baked dough product, by use of the fat particles) providing a salty flavor perception that is similar to a baked dough product that would contain the full amount (100 percent on a relative basis) of flavorant salt. The use of flavorant salt-containing fat particles to reduce overall salt content could be used in conjunction with other salt reduction opportunities.

In one aspect, the invention relates to a dough composition comprising flour, water, fat, and flavorant salt, the dough comprising: bulk dough comprising flour and water, and fat particles, the fat particles comprising solid fat and flavorant salt, wherein the amount of flavorant salt in the fat particles is at least 20 percent of a total amount of flavorant salt in the fat particles and bulk dough.

In another aspect the invention relates to a cooked dough product prepared from a dough composition as described herein, by baking or otherwise cooking the dough composition. In exemplary embodiments the fat particles are distributed in the cooked dough product to produce a non-uniform distribution of the flavorant salt throughout the cooked dough product.

In another aspect the invention relates to fat particles that include solid fat and particles of flavorant salt, e.g., comprising from about 1 to about 50 weight percent flavorant salt particles, and from about 50 to about 99 weight percent solid fat, based on total weight fat particles.

In yet another aspect, the invention relates to fat particles comprising solid fat and water droplets dispersed in the solid fat, the water droplets comprising dissolved flavorant salt. The fat particles can comprise: from about 50 to about 99 weight percent solid fat, and from about 1 to about 50 weight percent water in the form of droplets dispersed in the solid fat, the water comprising dissolved flavorant salt, based on total weight fat particles.

In another aspect the invention relates to a dry mix composition that includes flour, fat, and flavorant salt. The dry mix contains flour and fat particles and the fat particles include solid fat and flavorant salt. The amount of flavorant salt in the fat particles is at least 20 percent of a total amount of flavorant salt in the dry mix composition.

In another aspect the invention relates to a method of making fat particles. The method includes: heating solid fat to form liquid fat, adding flavorant salt particles to the liquid fat to produce flavorant salt-containing liquid fat, cooling the flavorant salt-containing liquid fat to form solidified flavorant salt-containing fat, and forming the solidified salt-containing fat into fat particles.

In another aspect the invention relates to a dough composition comprising flour, water, fat, and flavorant salt, the dough composition comprising: dough matrix (comprising flour, water, and other dough ingredients), and fat particles in the dough matrix. The fat particles comprise solid fat and flavorant salt. The amount of flavorant salt in the fat particles is at least 20 percent of a total amount of flavorant salt in the fat particles and dough matrix.

In another aspect the invention relates to a cooked dough product. The cooked dough product includes high local concentrations of flavorant salt and low local concentrations of flavorant salt distributed throughout the cooked dough, and high local concentrations of fat and low local concentrations of fat distributed throughout the cooked dough. The high local concentrations of fat are located at the same locations as the high local concentrations of flavorant salt. And the amount of flavorant salt in the high local concentrations is at least 20 percent of a total amount of flavorant salt in the dough composition.

BRIEF DESCRIPTION OF THE DRAWINGS

FIGS. 2A, 2B, and 2C show biscuits that contain flavorant salt.

FIGS. 6A and 6B are schematic illustrations of methods and equipment for preparing fat particles.

Figure 1A:
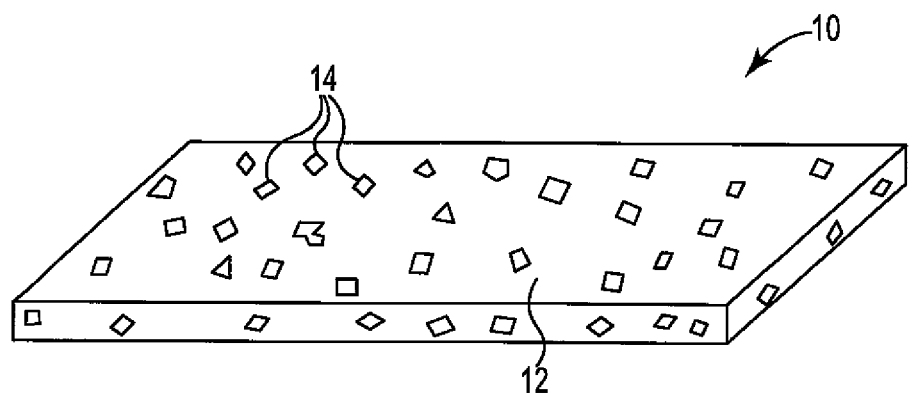
FIGS. 1A, 1B, and 1C show fat particles as described.

All figures are not to scale.

DETAILED DESCRIPTION

The following description relates generally to fat particles that contain flavorant salt, raw dough compositions that included the fat particles, baked dough products that are produced from the raw dough compositions, and methods that involve any of these.

Fat particles are a type of dough ingredient useful to produce food products such as raw dough products that can be baked to produce a baked dough product. Various fat particles are known, and certain useful embodiments of fat particles that can be modified for use according to the present description by adding flavorant salt to the fat particles as described herein are shown in U.S. Publication No. 2009/0311387, published Dec. 17, 2009; U.S. Ser. No. 12/880,685, filed Sep. 13, 2010; U.S. Ser. No. 13/017,942, filed Jan. 31, 2011; and PCT Application No. PCT/US2012/035143, filed Apr. 26, 2012, the entire descriptions of these being incorporated herein by reference.

The fat particles include and are prepared from fat that is in a solid form at room temperature (referred to herein as a "solid fat"), flavorant salt, optional water dispersed as droplets throughout the solid fat, and optional other added ingredients. Flavorant salt may be in the form of particles suspended throughout fat particles or concentrated at a surface of fat particles, or may additionally or alternately be contained (dissolved) within the optional water droplets suspended in the solid fat. Solid fat forms the bulk of the fat particle, and the solid fat can be referred to as making up a solid fat phase of the fat particles (separate from suspended water droplets or flavorant salt particles). The composition of the solid fat (or solid fat phase) is mainly or entirely fat ingredient, fat substitute, or a combination of fat ingredient and fat substitute, as described.

Multiple fat particles can together be included in a fat particle composition, each fat particle being a discrete and individually separate and distinct fat particle among the multiple fat particles of the composition. At a processing temperature used to prepare a food product such as a raw dough composition, the individual fat particles making up a fat particle composition are solid and do not adhere to one another to an appreciable degree. A useful or desirable melting temperature of a fat particle may be a temperature that results in a fat particle that is solid at a temperature used to incorporate the fat particles into an uncooked food product, such as a raw dough product. In practice, this may be room temperature (e.g., about 72 degrees Fahrenheit), or either above or below room temperature. If desired, ingredients of a dough composition (including the described fat particles) may be combined and processed into a dough composition or dough composition precursor, at a temperature between 50 and 90 degrees Fahrenheit, e.g., from 60 to 70 degrees Fahrenheit. A useful fat particle melting point can be above the temperature at which the fat particles will be processed into a food composition, such as in a range from 90 to 160 degrees Fahrenheit, or from 100 to 145 degrees Fahrenheit.

The fat particles may have any desired shape, for example, chips, flakes, grains, granules, rods, spheres, and other geometries. In many embodiments, fat particles can have a thickness dimension that ranges from about 0.020 to about 0.100 inches, e.g., from about 0.030 to about 0.070 inches, or from about 0.035 to about 0.055 inches. Exemplary fat particles can have the recited thickness, and also one more dimension that is at least 0.1 or 0.2 inch, optionally also a third dimension that is at least 0.1 or 0.2 inch. The color of fat particles can range from white to grey with a corresponding opaque to translucent transparency scale. Fat particles can be texturally described as hard and brittle, to rather soft and pliable, but will fracture and break upon sufficient deformation. The surface of fat particles may also exhibit some smear under shearing forces that will produce remnant residue on an article applying the shearing force.

As used herein the term "flavorant salt" refers to a salt that is added to a food (e.g., dough) composition with a principal purpose of affecting flavor, to provide a salty flavor, as opposed to a different purpose such as a preservative or leavening agent. Accordingly, flavorant salts (sometimes referred to herein as simply "salt") specifically include sodium chloride, potassium chloride, monosodium glutamate, and other chemicals such as a natural plant or cell extracts that can be used as salt substitutes or saltiness enhancers, for example, aqueous extracts from *S. herbacea* (saltwort), *L. japonica* (sea tangle), and *L. chinensis* (kukoshi). Conversely, added ingredients that fall within the chemical definition of a "salt" (i.e., a chemical compound formed by replacing hydrogen atoms of an acid with metal ions or electropositive radicals) but that are primarily added to a food composition for a non-flavor purpose, including sodium acid pyrophosphate (SAPP), sodium aluminum phosphate (SALP), Na-bicarbonate, and other salts functionally similar to these that are used in a dough composition for a principal purpose that is not to increase a salty flavor quality, are not flavorant salts as that term is used herein.

The flavorant salt may be present in a fat particle in any desired or useful form, including as particles dispersed or suspended, e.g., uniformly throughout a fat particle, i.e., throughout a solid fat phase. Alternately, salt particles can be concentrated substantially at a certain location or area of a fat particle such as at a level at or near a surface of a fat particle, such as by topically applying the flavorant salt particles to a surface of liquid fat and allowing the fat to solidify with the salt particles remaining on or at or near the surface. Flavorant salt particles distributed throughout a salt particle or concentrated at a surface may be of any useful size, and according to some embodiments may be in a form referred to as either "superfine" or "ultrafine" flavorant salt particles. Flavorant salt in the form of salt particles can be used in any of the fat particles described herein, including fat particles made of any of the described types of fat ingredients, fat substitutes, or a combination of one or more of the described fat ingredients or fat substitutes. Such fat particles containing flavorant salt in the form of salt particles may either contain dispersed water droplet, or may not contain dispersed water droplets.

The size of flavorant salt particles can affect the ability to disperse the flavorant salt particles within a solid fat or solid fat ingredients, while the solid fat or a fat ingredient is in liquid form (e.g., heated to above a melting temperature). Granulation size of flavorant salt particles can be measured in terms of a bulk density. Bulk densities of flavorant salt particles that have been found to be useful or preferred for dispersing the particles in a liquid fat ingredient can be: less than about 70 pounds per cubic foot, preferably less than about 60 pounds per cubic foot, more preferably less than about 50 pounds per cubic foot, and most preferably less than about 40 pounds per cubic foot. Alternately, granulation size of flavorant salt particles can be measured by particle size analysis, by any of various known methods such as histrogam analysis. According to certain embodiments of flavorant particles, granulation size (mean particle size) may be in a range from about 1 to 100 micrometer (μm), e.g., from about 1 to 50 micrometer, or from about 1 to 10 micrometer. For comparison, granulation size of typical table salt can be from about 150 to 400 micrometers, and "fine" salt can be less than about 150 micrometers. Any of these forms of flavorant salt particles can be useful in a fat particle as described.

As an alternative, flavorant salt may be present in fat particles in the form of dissolved flavorant salt contained in water droplets suspended in hydrated fat particles. The flavorant salt may be conveniently dissolved in water, and the water can be dispersed and suspended in the fat particles to provide a desired amount of flavorant salt within the fat particles. The concentration of flavorant salt in the water droplets may be any useful concentration, in combination with an amount of water droplets in the fat particle, as desired to provide a total flavorant salt concentration in the fat particle. For example, water suspended as droplets in a fat particle may contain dissolved flavorant salt in a concentration up to 50 grams dissolved flavorant salt per 100 grams salt and water of the suspended droplets, e.g., from 5 to 40 grams dissolved flavorant salt per total grams salt and water in the suspended droplets.

The fat particles can contain any amount of flavorant salt desired for a particular fat particle or food (e.g., dough) formulation, and as allowed by the physical ability of the fat particle to contain the salt. The upper limit on an amount of flavorant salt included in a fat particle is based on the physical ability of the fat particle to contain the flavorant salt as flavorant salt particles suspended in the fat particle, as flavorant salt particles distributed at a surface of the fat particles, or as flavorant salt dissolved in water droplets that are suspended and distributed throughout the fat particle. While the upper limit is based on the ability to place a maximum concentration of flavorant salt in a fat particle, examples of amounts of flavorant salt in a fat particle or fat particle composition (whether the fat particle or particles contains suspended water, or not) can be in a range from about 0.5 to about 50 weight percent flavorant salt based on the total weight of a fat particle or fat particles of a fat particle composition, such as from about 1 to about 40 weight percent flavorant salt based on the total weight of the fat particle or particles, or from about 2, 3, 4, or 5 to about 10, 15, 20, 25, or 30 weight percent flavorant salt based on the total weight of the fat particle or particles. These ranges are generalized and not specific to or required for any particular embodiment of the flavorant salt-containing fat particles or a particular food product, in that a desired weight percent of flavorant salt in any particular fat particle can vary over or beyond these ranges based on factors such as the total amount of desired flavorant salt in a food (e.g., dough) composition, and the desired uniformity or non-uniformity of the distribution of the flavorant salt in a food (e.g., cooked dough) composition, among other factors.

The fat particles include one or more fat ingredient that alone or in combination forms a solid fat. The solid fat is made of one or more fat ingredient that is solid at a processing temperature (e.g., room temperature), and may optionally include one or more fat ingredient that is liquid (to any extent, including semi-solid) at room temperature. A "fat ingredient" as that term is used herein described a relatively pure oil, solid fat, liquid fat, or semi-solid fat material that is useful as a fat ingredient for commercial food products and has levels of impurities that are commercially acceptable. A fat ingredient can preferably exhibit a high triglyceride content such as at least 90 or 95 percent by weight triglyceride, e.g., 98 or 99 percent by weight (or higher) triglyceride, based on the total weight of the fat ingredient. The fat ingredient may include low amounts of impurities such as monoglyceride, diglyceride, or fatty acids, such as less than about 2 percent by weight, e.g., less than 1 percent by weight, e.g., less than 0.5 percent by weight, or merely trace amounts, based on the total weight of the fat ingredient.

The fat particles can contain any amount of solid fat that allows formation of particles as described, e.g., from about 50 to about 99 weight percent solid fat based on the total weight of the fat particles, preferably from 60 to 95 weight percent solid fat, or from 65 to 90, or from 70 to 85 weight percent solid based on the total weight of the fat particles.

Fat substitutes may be included in a solid fat but may be disfavored and may be excluded from embodiments of solid fat, fat particles, and fat particle compositions as described herein. A fat substitute is considered to be a food product that can mimic a fat in a food product such as dough, and that generally will have similarly useful stability and physical properties as a natural fat with fewer kilocalories per gram than fat. Exemplary fat substitutes include chemically modified or derivative compounds of carbohydrates, proteins, fats, and combinations of these, including materials sold under the trade names Avicel (cellulose), Stellar (dextrin, modified starch) WonderSlim (fruit-based fiber), Betatrim (grain-based fiber), Kelgum (hydrocolloid gum), Maltrin (maltodextrin), Grinsted (pectin), Simplesse (microencapsulated protein), Dairy-Lo (modified whey protein concentrate), Caprenin (altered triglycerides), Olean (Olestra) (sucrose polyester), Mimix (carbohydrate and protein), and Optamax (carbohydrate and fat).

Certain fat particle embodiments, solid fats, and fat ingredients, can contain a relatively low or reduced amount of trans fatty acids, and may be referred to as exhibiting "low" trans fat. Trans fat refers to a monoglyceride, diglyceride, or triglyceride molecule that contains at least one esterified fatty acid molecule that has a trans configuration (i.e., a trans fatty acid). Trans fatty acids may be formed, for example, during hydrogenation of unsaturated fatty acids. A low trans fat composition (particle, solid fat, or fat ingredient) may contain about 50 weight percent or less trans fatty acids, for example, about 25 weight percent or less trans fatty acids, based on the total weight of the composition (e.g. fat particle, solid fat, or fat ingredient). Other embodiments of fat particles, solid fats, and fat ingredients, may be referred to as "trans free," meaning that the fat particles, solid fat, or fat ingredient, contains trans fatty acids in an amount of about 4 weight percent or less based on the total weight of the fat particles, solid fat, or fat ingredient.

The solid fat can contain one or more fat ingredient, as that term is presented herein. Examples of useful fat ingredients include various materials that are well known in the fat and baking arts, or presently or future-developed, any of which may be referred to herein as base oils or processed base oils. A processed base oil is a base oil that has been processed by interesterification (interesterified base oils), hydrogenation (hydrogenated base oils, fully hydrogenated base oils, and partially hydrogenated base oils), fractionation (fractionated base oils), or another process to refine the base oil to increase a melting temperature of the base oil. Some fat ingredients exist in a solid form at room temperature, and can be used alone as a solid fat. Alternately, a fat ingredient such as certain base oils may be liquid at room temperature, but can be combined with another fat ingredient (e.g., a processed base oil) that is solid at room temperature, to produce a solid fat.

A solid fat that is made from only a fat ingredient, as defined, or a combination of fat ingredients, and that does not contain any additional material or ingredient, is considered to consist of fat ingredient (meaning either a single fat ingredient or a combination of two or more fat ingredients). A solid fat that is prepared from fat ingredient (one or a combination) and less than one or two percent by weight additional materials or ingredients is considered to consist essentially of fat ingredient (meaning either a single fat ingredient or a combination of two or more fat ingredients).

A solid fat can include, consist of, or consist essentially of one or more base oil as fat ingredient. A base oil is a fat material, presently known or future-developed or identified, that includes fatty acid esters of glycerol, for example, monoglycerides, diglycerides, and triglycerides, that is liquid, solid, or semi-solid at room temperature, and that is extracted, collected, cleaned, purified, or otherwise derived and processed from a naturally occurring source (including genetically modified organisms), in a manner to produce a fat ingredient as that term is used herein. A base oil may be processed by one or more of: hydrogenation (full or partial), interesterification, fractionation, or another process that increases the melting point of the base oil, in which case the processed base oil is referred to herein as a processed base oil, e.g., a hydrogenated (fully or partially) base oil, an interesterified base oil, or a fractionated base oil. The unmodified term "base oil," used without reference to one of these processes, refers to a base oil that has not been processed by hydrogenation (full or partial), interesterification, or fractionation, etc.

Examples of base oils include natural or genetically modified soybean oil, corn oil, canola oil, copra oil, cottonseed oil, peanut oil, safflower oil, olive oil, sunflower oil, peanut oil, palm oil, palm kernel oil, coconut oil, rice bran oil, rapeseed oil, other vegetable nut or seed oils. Also useful are butter, lard, tallow, fish oils, and other like fatty acid and triglycerides that can be derived from animals, plants, and microorganisms and processed to form a fat ingredient. Mixtures of any of the foregoing base oils may also be useful.

In certain embodiments, a solid fat may include base oil in an amount up to 100 percent by weight of the solid fat. In other embodiments a base oil may be present in any partial amount by weight of a solid fat, the amount being based on factors such as the desired properties of a solid fat. A useful solid fat may comprise, consist of, or consist essentially of base oil, processed base oil, fat substitute, or any combination of two or more of these.

Other types of fat ingredients include those that are derivatives of base oils, processed to increase melting point, such as by partial hydrogenation, full hydrogenation, interesterification, fractionation or otherwise.

Many processed base oils are solid at room temperature or very near room temperature. Certain preferred processed base oils may have a melting temperature of not less than about 90 degrees Fahrenheit, e.g., not less than about 100 degrees Fahrenheit. The processed base oil, being derived from base oil, will contain glycerides of fatty acids such as monoglycerides, diglycerides, and triglycerides. The glycerides can have a fatty acid composition that comprises a very high percentage of saturated fatty acids. A processed base oil can be very low in trans fatty acids.

Processed base oil can be present in a solid fat in any desired amount, up to and including 100 percent of the solid fat (solid fat phase) of a fat particle. Accordingly, a solid fat may consist of or consist essentially of one or more processed base oil. In other embodiments, a solid fat may consist of or consist essentially of a mixture of base oil and processed base oil.

In exemplary low trans embodiments, a processed base oil can be a partially hydrogenated base oil, such as partially hydrogenated soybean oil, for example, having an iodine value (IV) ranging from about 50 to about 90. A partially-hydrogenated soybean oil typically contains from about 15 weight percent to about 50 weight percent trans fatty acids. In an exemplary trans free embodiment, a useful base oil for processing to a processed base oil can be a refined, bleached, and deodorized (RBD) palm oil. Palm oil typically contains about 50% saturated fatty acids and about 50% unsaturated fatty acids. The content of trans fatty acids of palm base oil or a processed palm base oil can range from about 0 to about 4%.

One form of processed base oil is hydrogenated base oil. Hydrogenation is a process by which unsaturated fatty acids present in a base oil are hydrogenated to increase an amount of saturated fatty acids. Techniques for hydrogenation are known in the fat, chemistry, and food ingredient arts, and include, for example, reacting a base oil having unsaturated fatty acids with hydrogen gas in the presence of a hydrogenation catalyst, for example, a supported nickel catalyst. The hydrogenated base oil may be fully-hydrogenated to achieve an iodine value (IV) of about 10 or less, or about 5 or less. Representative hydrogenated base oils, which take the form of solid fats, include hydrogenated cottonseed oil, hydrogenated soybean oil, hydrogenated palm oil, palm oil, fully-hydrogenated palm kernel oil, fully-hydrogenated coconut oil, and mixtures thereof. A particular example of a useful hydrogenated base oil is fully-hydrogenated soybean oil, for example in the form of flakes that can be obtained commercially under the trade designation "DRITEX S FLAKES" (from ACH Food Companies, Inc. of Cordova, Tenn.).

Another form of processed base oil is fractionated base oil. Fractionated base oils are generally known, as is the process of fractionation of base oils. Fractionation is a process of separating a base oil into substituent components of the base oil based on a physical property, such as by distillation. Examples of fractionated base oils include fractionated coconut oil, fractionated palm oil, and fractionated palm kernel oil. Fractionated palm oil contains stearine fraction of the base (palm) oil.

Another form of processed base oil is interesterified base oil. Interesterification refers to the process of rearranging the distribution of fatty acids on triglyceride molecules, resulting in melting and crystallization characteristics that are similar to partially hydrogenated oils, but without creation of trans fatty acids. Interesterification may be conducted using techniques known to those of skill in the fat and fat processing arts and may be conducted by an enzymatic process or a chemical process. Details of interesterification can be found, for example, in "*Interesterification Products and Processes*" JOACS, September 1967; Vol. 41; 414A.

Interesterified base oils include known fat ingredients derived from fat components by interesterification. The term "interesterified base oil" is understood to refer to the processed base oil that results from interesterification of one or more base oil. An interesterified base oil produced by interesterification of two different base oils will not continue to contain the two different original base oils in their original forms. Upon interesterification of reactant base oils, the product interesterified base oil will contain the product of the interesterification process, the "interesterified base oil," which is the resultant processed (interesterified) base oil that contains the original fat components (mainly triglycerides), with the fatty acid molecules of each of the original triglycerides rearranged between the original triglyceride molecules, i.e., interesterified. As is understood, an "interesterified base oil" that is said to "comprise" one, two, or more different base oils, refers to an interesterified base oil derived from or prepared by interesterification of the one, two, or more different base oils.

Certain useful or preferred interesterified base oils can be derived from at least two different base oils, wherein the combined stearic acid content of the two different base oils prior to interesterification is in a range from about 38 weight percent to about 60 weight percent, e.g., from about 40 weight percent to about 52 weight percent. Upon interesterification, the resultant interesterified base oil will exhibit the same stearic acid content as the total stearic acid content of the original (reactant) base oils used to prepare the interesterified base oil.

Exemplary interesterified base oils can be prepared from at least two base oils, one being a high melt point base oil and another being a low melt point base oil. As used herein, a high melt point base oil is a base oil that has a melting point, as measured by Mettler Dropping Point, of 100 degrees Fahrenheit or greater, e.g., 120 degrees Fahrenheit or greater, or 130 degrees Fahrenheit or greater, or 140 degrees Fahrenheit or greater, 150 degrees Fahrenheit or greater, 160 degrees Fahrenheit or greater, or 170 degrees Fahrenheit or greater. A low melt point base oil is a base oil that has a melting point, as measured by Mettler Dropping Point, that is below 100 degrees Fahrenheit, e.g., that is 80 degrees Fahrenheit or lower, or 70 degrees Fahrenheit or lower, such as 40 degrees Fahrenheit or lower, 20 degrees Fahrenheit or lower, or 0 degrees Fahrenheit or lower. Relative amounts of high and low melt point base oils can also be selected to result in a dough or baked dough product prepared from the interesterified base oil having a desired combination of taste, feel, texture, and aesthetic properties. In certain preferred embodiments, an interesterified base oil can be prepared from about 65 weight percent to about 20 weight percent low melt point base oil (e.g., liquid (at room temperature) oil such as liquid soybean oil) and from about 35 to about 80 weight percent high melt point base oil (e.g., fully hydrogenated oil such as fully hydrogenated soybean oil, which is a liquid at room temperature). One example of a useful interesterified base oil is available under the trade designation "106-150" from Archer Daniels Midland (ADM). This fat ingredient is a 100% soy interesterified shortening having 0 grams trans fat per serving and 4% trans fat maximum.

According to certain embodiments, a solid fat can comprise, consists of, or consist essentially of, fat ingredient that is a non-tropical base oil or a processed non-tropical base oil (collectively: "non-tropical base oil fat ingredient"). A non-tropical base oil fat ingredient is a fat ingredient that consists of non-tropical base oil, processed (partially hydrogenated, fully hydrogenated, interesterified, or fractionated) non-tropical base oil, or a combination of two or more of these, but no tropical base oil and no processed (partially hydrogenated, fully hydrogenated, interesterified, or fractionated) tropical base oil.

A non-tropical base oil is an oil derived from a plant or other organism that is not a "tropical" plant or other tropical organism—the term "non-tropical base oil" excludes "tropical oils." The term "tropical oil" as used herein is given its ordinary meaning in the food arts, referring to any of several oils of tropical trees or plants such as coconut, palm oil, and palm kernel oil, that contain low amounts of polyunsaturated fatty acid and are high in saturated fatty acids (Coconut oil is considered to contain about 92% saturated fat; palm kernel oil contains about 82% saturated fat; and palm oil contains about 50% saturated fat). A "tropical" tree or plant is one that is characteristic of or capable of growing naturally in a tropical region or climate, e.g., one that is frost-free with temperatures high enough to support year-round plant growth given sufficient moisture (e.g., tropical Florida); alternately, a tropical climate according to the Koppen climate classification, which is a non-arid climate in which all twelve months have mean temperatures above 18 C (64 F).

Examples of non-tropical base oils include oils obtained from soybean, rapeseed (canola), sunflower, peanut, hazelnut, walnut, cottonseed, olive, corn, grapeseed, rice bran, sesame, safflower, linseed/flax, oat, and wheat germ. These non-tropical base oils in their natural forms include relatively lower amounts of saturated fat compared to tropical oils, such as below about 27 percent saturated fat (cottonseed oil is about 26 percent saturated fat by weight), or less than about 16 percent saturated fat (soybean oil is about 15 percent saturated fat by weight). Also within the scope of non-tropical oils are oils derived from animals (e.g., lard, tallow, butter), microorganisms, and plants. The use of non-tropical base oils may be preferred because tropical base oils (e.g., palm, palm kernel oil, coconut, shea butter, and allanblackia) are expensive and typically contain high amounts of saturated fatty acids. In addition, some types of tropical oils (e.g., palm oil and palm kernel oil) have been associated with destruction of the rainforest. In many embodiments, a fat ingredient can be prepared from greater than about 50 weight percent non-tropical base oil, e.g., greater than about 75 weight percent or greater non-tropical base oil, or greater than about 90 or about 99 weight percent or greater non-tropical base oil, based on the total weight of the fat ingredient. In exemplary embodiments a fat ingredient can be 100 percent by weight non-tropical base oil (optionally mixtures that can include processed non-tropical base oil), such as soybean oil.

Optionally, a fat particle may include an amount of water in the form of suspended or dispersed water particles, forming a water-in-fat (solid) emulsion. The amount of water may be as desired and useful, e.g., an amount that will allow the fat particle to be formed into and remain stable as a solid fat particle with suspended water droplets, i.e., a room temperature solid water-in-fat emulsion. For example, a fat particle may include up to about 50 weight percent water based on the total amount of fat particle, e.g., from about 5 to about 40 weight percent water based on the total weight of the fat particle, or from about 10 to about 30 weight percent water. Fat particles that contain water droplets are sometimes referred to herein as hydrated, and fat particles that do not contain water droplets are sometimes referred to as non-hydrated or anhydrous. The water droplets can be of any size, and may have a size (i.e., diameter or average diameter) ranging from about 1.5 um to about 10 um.

A fat particle may optionally include additional ingredients such as preservatives, emulsifier, hydrocolloid, colorant, etc., to provide desired color or stability properties, each in an amount of less than 2 percent, e.g., less than 1 percent, per type of ingredient, based on total weight fat particle. The total amount of any combination of these additives can be low, such as below about 15 percent by weight of a fat particle, e.g., below about 10 percent by weight of a fat particle, or below about 5, 2, or 1 percent based on total weight fat particle.

In some embodiments the fat particles include a hydrocolloid that serves as an emulsion stabilizer. Representative examples of hydrocolloids include agar, alginate, alginate+ calcium, arabinoxylan, carrageenan, carrageenan+calcium, carboxymethylcellulose, cellulose, cellulose gum, cyclodextrins (in the presence of fat or other hydrophobic ligand), curdlan, gelatin, gellan, B-Glucan, guar gum, gum arabic, and hydroxypropylmethylcellulose (HPMC), konjac locust bean gum, methyl cellulose, pectin, pectin+calcium, soybean soluble polysaccharide (SSP), starch, xanthan gum, and mixtures thereof. Preferred examples of hydrocolloids include agar, carrageenan, cellulose gum, locust bean gum, xanthan gum, and mixtures thereof. When included, the hydrocolloid is typically present in an amount ranging from about 0.01 weight percent to about 0.30 weight percent, or in an amount ranging from about 0.05 to about 0.15 weight percent, based on total weight fat particle.

In some embodiments the fat particles can include one or more emulsifier. Examples of emulsifiers include non-hydrogenated, partially- and fully-hydrogenated derivatives as well as fractions of the following classes of emulsifiers: lecithins, mono and diglycerides, acid esters of mono and diglycerides (AMGS or alpha-monoglycerol stearate is a distilled monoglyceride of this class), diacetyltartaric esters of monoglycerides (DATEM), polyglycerol esters, sucrose esters, sorbitan esters, polysorbates, propylene glycol fatty acid esters, stearoyl-2-lactylates, oleoyl lactylates, ammonium phosphatides, silicates, and mixtures thereof. One useful emulsifier blend comprises polyglycerol polyricinoleate (PGPR is a polyglycerol ester of castor oil fatty acids) and distilled monoglycerol of about 10% monopalmitin and about 90% monostearin. PGPR may be obtained, for example, under the trade designation "DREWPOL PGPR" (from Stepan Co.) or "GRINDSTED PGPR 90" (from Danisco Co.). Distilled monoglycerol may be obtained, for example, under the trade designation "ALPHADEVI DBK" (from Caravan Ingredients) or "DIMODAN HS K-A" (from Danisco Co.). The emulsifier or emulsifier blend is typically present in the fat particles in an amount ranging from about 0.10 to about 5.0 weight percent, based on total weigh fat particle.

Exemplary fat particles can comprise, consist of, or consist essentially of the solid fat as described herein, along with flavorant salt particles. A fat particle that consists of the solid fat and flavorant salt refers to a fat particle that is prepared only from solid fat as described (e.g., base oil, processed base oil, or a combination of these), the flavorant salt, and no other added ingredients such as a fat substitute ingredient, added water, or any additional separately added ingredients. A fat particle that "consist essentially" of the solid fat, as described herein, along with the flavorant salt as described, refers to a fat particle that consists of these ingredients, and that can additionally include up to 1 or 2 percent by weight added ingredient. Alternate fat particle embodiments can include additives as described herein.

Alternate exemplary fat particles can comprise, consist of, or consist essentially of the solid fat, as described herein, along with the flavorant salt as described, suspended water droplets, and emulsifier. A fat particle that consists of the solid fat, flavorant salt, suspended water droplets, and emulsifier, refers to a fat particle that is prepared only from solid fat as described (e.g., base oil, processed base oil, or a combination of these), the flavorant salt, water, emulsifier to stabilize the water droplets within the solid fat, and no other added ingredients such as a fat substitute ingredient or any additional separately added ingredients. A fat particle that "consists essentially" of the solid fat, flavorant salt, water, and emulsifier, refers to a fat particle that consists of these ingredients and that can additionally include up to 1 or 2 percent by weight added ingredient. Alternate fat particle embodiments can include additives as described herein.

While the general and specific features of fat particles described herein will be understood as useful in various food applications, Applicant's copending applications U.S. Publication No. 2009/0311387, published Dec. 17, 2009; U.S. Ser. No. 12/880,685, filed Sep. 13, 2010; U.S. Ser. No. 13/017,942, filed Jan. 31, 2011; and PCT Application No. PCT/US2012/035143, filed Apr. 26, 2012 (each of which is incorporated herein by reference), describe examples of useful fat particles that exhibit features that may be of particular use in certain food applications, such as in dough compositions, such as certain Solid Fat Content and measured Mettler Drop Point. Consistent with those patent documents, certain specific examples of fat ingredients can comprise, consist of, or consist essentially of, a combination of interesterified base oil and hydrogenated (e.g., fully hydrogenated) base oil, wherein the interesterified base oil and the hydrogenated base oil are prepared from non-tropical base oils. Exemplary fat ingredients can contain from about 50 to about 98 weight percent interesterified base oil and from about 2 to about 50 weight percent hydrogenated base oil such as fully hydrogenated soybean oil, e.g., from about 75 to about 96 weight percent interesterified base oil and from about 4 to about 25 weight percent fully hydrogenated soybean oil.

Independently, a fat ingredient or a fat particle can exhibit a Solid Fat Content (SFC) profile having a slope of about −0.45 to about −1.77 (% solids/° C.), and a Mettler Drop Point of about 54° C. to about 62° C., or from about 58° C. to about 62° C.

SFC is determined for a fat sample by detecting the NMR signal from both liquid and solid components in the fat sample, or by detecting the change in the liquid signal as it is displaced by solid. AOCS methods for determining SFC include AOCS Cd 16b-93 revised in 2000 (Direct Method) and AOCS Cd 16-81 revised in 2000 (Indirect Method). Using SFC, a melting curve or SFC profile can be created by measuring SFC for a fat sample at several different temperatures and then plotting SFC as a function of temperature. The slope of the SFC profile can be determined by using numerical methods to fit a line to the SFC values, and performing linear regression to establish the slope and intercept of the fitted line. Using this technique, a line having the linear form SFC (% solids)=m (° C.)+b can be obtained where m is the slope of the SFC profile in (% solids/° C.), and b is the y-intercept of the SFC profile in (% solids). An SFC profile and a related slope can be determined by linear regression of SFC values measured at two or more temperatures across the range of relevant temperatures, the temperatures being selected to achieve a representative sample; a useful set of temperatures for determining a slope of an SFC profile can be the following five temperatures at which SFC measurements can be individually taken and upon which resultant data linear regression can be performed to determine a slope: 10° C., 21.1° C., 26.7° C., 33.3° C., and 40° C. Other temperatures can alternatively be useful.

Mettler Drop Point (MDP) refers to the result obtained from AOCS Official method Cc 18-80 entitled "Dropping Point."

In alternate or more specific embodiments, a fat ingredient or solid fat as described herein can comprise, consist of, or consist essentially of: an interesterified base oil and a processed base oil, wherein the interesterified base oil and processed base oil are prepared from non-tropical base oils.

Independently, a fat ingredient or fat particle can exhibit a Solid Fat Content (SFC) profile that fits the equation:

$$y=mx+b$$

where:
y is the SFC in % solids;
m is the slope of the SFC profile which ranges from about
−0.45 to −1.77 (% solids/° C.);
x is the temperature in ° C.; and
b is the intercept of the SFC profile which ranges from about 40 to about 74 (% solids); and
wherein the fat particles exhibit a Mettler Drop Point (MDP) of about 54° C. about 62° C., or a MDP of from about 58° C. to about 62° C.

Referring to FIG. 1A, a representative embodiment of a non-hydrated (anhydrous, meaning the particles do not contain suspended water droplets but may contain minor amounts of water in other forms, e.g., absorbed) fat piece (fat particle) 10 is shown. Non-hydrated fat piece 10 comprises continuous fat phase 12 and dispersed flavorant salt particles 14. Continuous fat phase 12 comprises, consists of, or consists essentially of solid fat as described. Flavorant salt particles 14 are particles of flavorant salt of any desired size and composition, such as superfine salt particles, distributed throughout continuous fat phase 12.

Figure 1B:
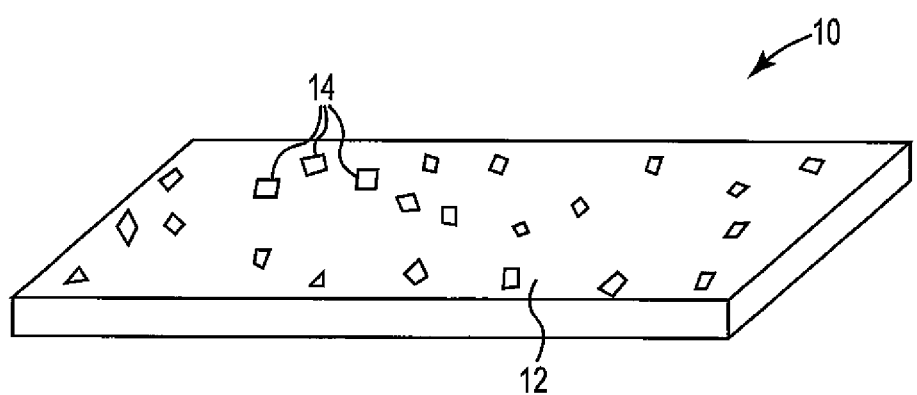

Referring to FIG. 1B, a representative embodiment of non-hydrated fat piece (fat particle) 10 of the invention is shown. Non-hydrated fat piece 10 comprises continuous (solid) fat phase 12 and flavorant salt particles 14 concentrated at a top surface, but not substantially distributed below the surface in the bulk portion of fat phase 12. Continuous fat phase 12 comprises, consists of, or consists essentially of solid fat as described. Flavorant salt particles 14 are particles of flavorant salt of any desired size and composition, such as superfine salt particles, distributed throughout continuous fat phase 12.

Figure 1C:
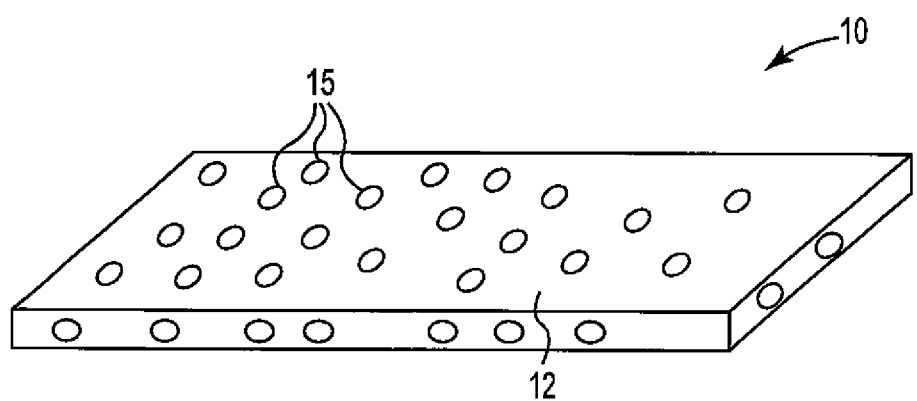

Referring now to FIG. 1C, a representative embodiment of a hydrated fat piece (fat particle) 10 of the invention is shown. Hydrated fat piece 10 comprises continuous fat phase 12 and dispersed water phase 15. Continuous fat phase 12 comprises, consists of, or consists essentially of solid fat as described, with droplets of water phase 15 distributed throughout to form a water-in-fat emulsion. Flavorant salt is dissolved in water phase 15.

FIGS. 2A, 2B, and 2C show examples of dough products (biscuits) that are made using flavorant salt-containing fat particles. FIG. 2A shows a control biscuit that contains a conventional amount of flavorant salt, e.g., from about 0.5 to about 3 weight percent flavorant salt based on the total weight of the raw dough used to produce the baked biscuit. The flavorant salt is distributed evenly throughout the baked biscuit. FIG. 2B shows a biscuit made of the same raw dough as the biscuit of FIG. 2A but with a reduced amount of flavorant salt, i.e., 50 percent of the amount of flavorant salt used to make the baked biscuit of FIG. 2A. The FIG. 2B biscuit may be preferred as a food product having reduced sodium content, but the FIG. 2B biscuit will have reduced salty flavor due to the lower amount of uniformly distributed flavorant salt it contains.

FIG. 2C shows a baked biscuit prepared from flavorant salt-containing fat particles as described herein. The figure shows that the total amount of flavorant salt is similar to the amount in the biscuit shown at FIG. 2B. Beneficially, the total amount of salt in the FIG. 2C biscuit results is a reduced amount of total sodium in the biscuit. Yet the total amount of flavorant salt is not uniformly distributed throughout the baked biscuit, as is the salt of the FIG. 2B biscuit. Instead, the flavorant salt, placed within fat particles in the raw dough, exhibits a non-uniform distribution between locations of high concentration of flavorant salt (at the loci of the fat particles before and after baking) and locations of no salt (at locations of the bulk dough, away from the fat particles). The flavorant salt-containing fat particles result in these high localized concentrations of the flavorant salt in the raw and baked dough products.

Figure 3:
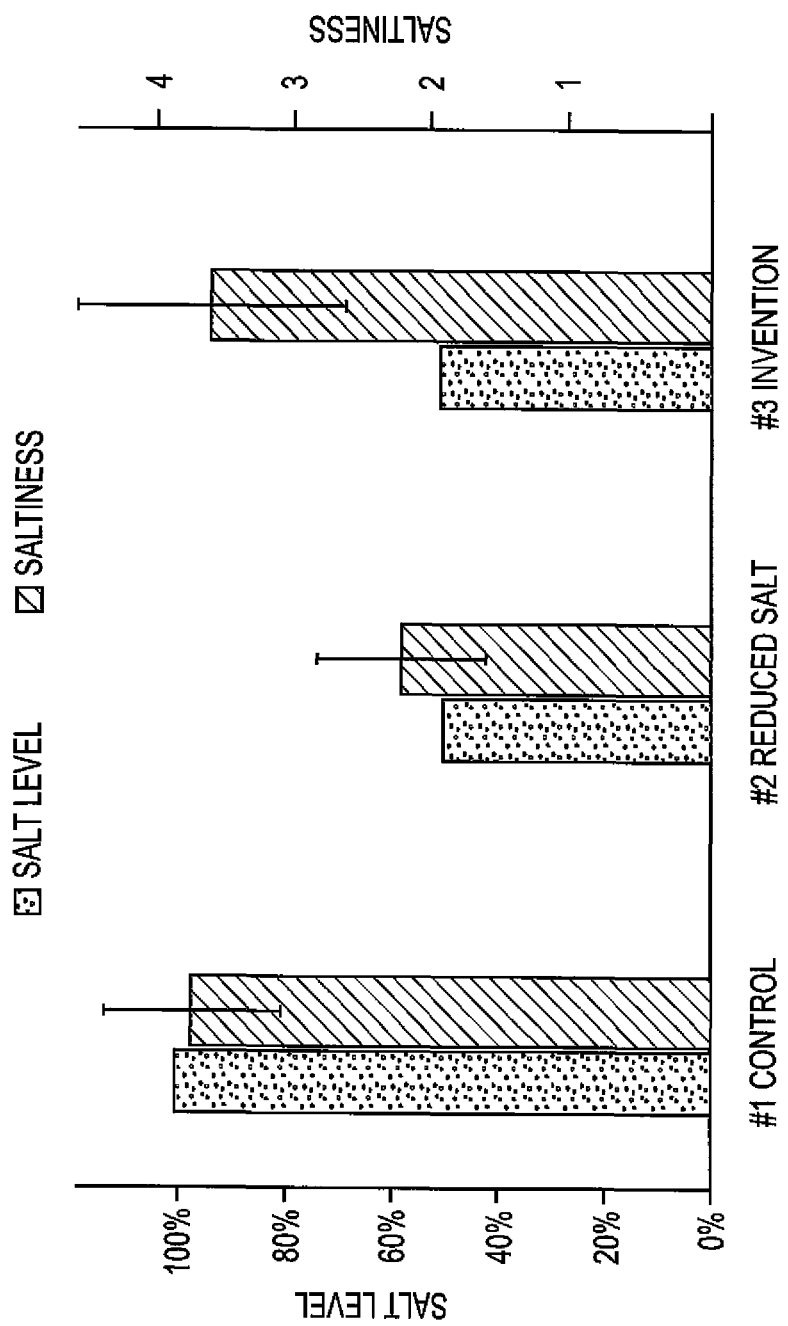
FIG. 3 is an illustration of saltiness effects of flavorant salt included in different forms in a biscuit.

Advantageously, high localized concentrations of flavorant salt, even with reduced total flavorant salt content, have been found to produce a taste response that is similar to that of a baked dough product that contains a higher total amount of salt. As shown at FIG. 3, the FIG. 2A (#1 Control) biscuit sets a baseline of "saltiness" (taste response) for a dough having a normalized (100%) salt level. The FIG. 2B (#2) biscuit shows that a reduced total salt content results in a reduced "saltiness" (taste response) of the dough; a reduced and more healthful amount of sodium reduces flavor appeal. The FIG. 2C (#3 Invention) biscuit shows that a reduced total flavorant salt content can produce a higher than expected "saltiness" (taste response), if the flavorant salt is contained in the baked dough product in high localized concentrations, such as by the use of flavorant salt-containing fat particles described herein.

Figure 4A:
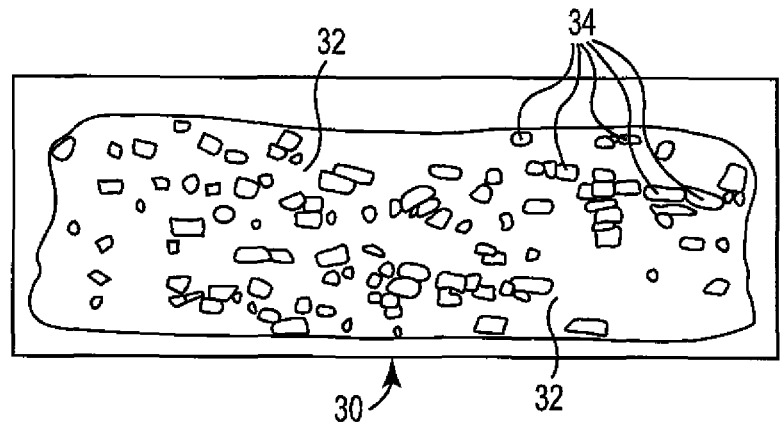
FIG. 4A is a cross section view of a raw biscuit that contains fat particles as described.
Figure 4B:
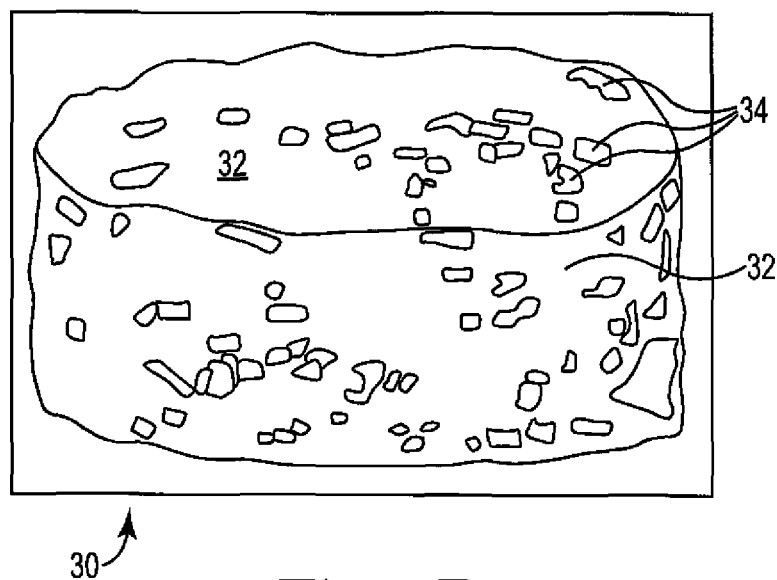
FIG. 4B is a side perspective view of a cooked biscuit that contains fat particles as described.

FIG. 4A shows an example of a raw biscuit dough prepared as described herein to contain flavorant salt-containing fat particles. FIG. 4A shows the cross section of dough piece (biscuit) 30, which contains bulk dough 32 (which may contain dough fat, dough salt, or both) (the bulk dough or bulk dough composition may alternately be referred to as a dough "matrix") and flavorant salt-containing fat particles 34 distributed throughout bulk dough 32, including at outer surfaces. FIG. 4B is a side-perspective view of biscuit 30 after baking. After baking, particles 34 remain dispersed throughout bulk dough 32 both internally and at the outer surface (as illustrated).

Figure 5:
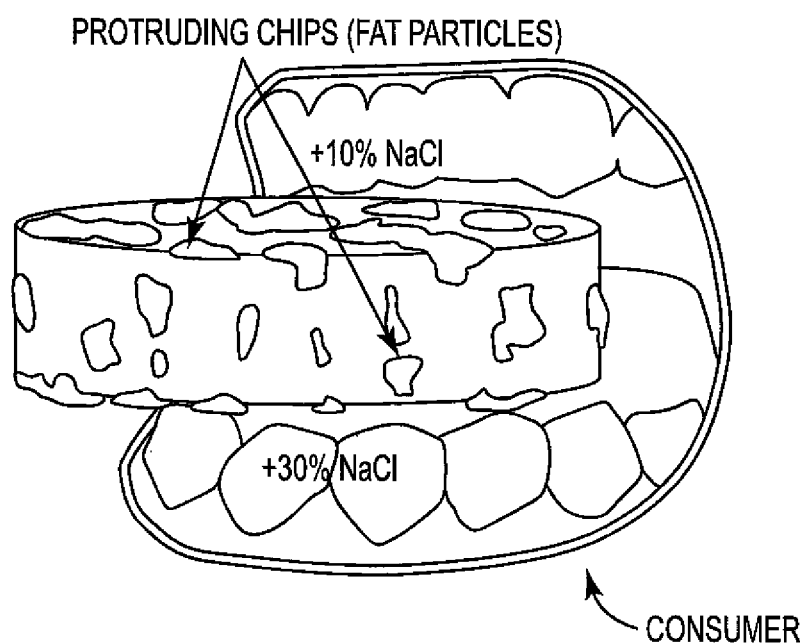
FIG. 5 is an illustration of a baked biscuit as described, used by a consumer.

FIG. 5 illustrates additional (optional) desirable features of embodiments of food products as described, which are: the presence of a flavorant salt gradient at surfaces of a baked dough piece; protruding fat particles, i.e., fat particles present at the outer surface of the baked dough product; and a cooked food product that includes high local salt concentration in combination with high local fat concentration, especially at dough surfaces. In effect, the fat particles are used to deliver a high local concentration of flavorant salt. These features, if present alone or in combination, can result in increased flavorant salt taste perception, such as a level of flavorant salt taste perception that, for a given flavorant salt concentration of a baked dough piece, is higher than the flavorant salt taste perception that would be present if the flavorant salt were present in a form other than in flavorant salt-containing fat particles.

Shortening particles as described may be prepared using a flaking apparatus as shown in FIG. 6A. Flaking apparatus 100 includes fat reservoir 110, which holds a liquid fat composition 120, i.e., solid fat in a liquid form that is to be solidified and flaked to form fat particles as described herein. While present in reservoir 110 during processing, the temperature of solid fat (fat composition) 120 is above the melting point of the solid fat, and the solid fat will be in the form of a liquid fat composition 120.

Mounted in reservoir 110 is high shear mixer 115 equipped with high shear-mixing blade 130. Examples of suitable high shear mixers include Breddo, IKA Rototron, Ross brand high shear mixers, and LIGHTNIN brand variable speed high shear mixers. Fat reservoir 110 is connected to jacketed piping 150, which includes valve 152, pump 154, and flow meter 156. Temperature controlled chute 160 is mounted in close proximity to flaking roll 180 for application of the fat composition 120 (in the form of a liquid) to outer surface 210 of flaking roll 180. Flaking roll 180 is rotatably mounted so that during operation of apparatus 100 flaking roll 180 rotates about its axis 185. Scraping blade 220 is positioned in contact with outer surface 210 of flaking roll 180 to scrape the solidified fat composition 120 from the surface of flaking roll 180.

In operation of apparatus 100A, a liquid fat composition (a solid fat, at a temperature above its melting temperature) 120A is prepared in reservoir 110A. The high shear mixer 115A is used to mix the fat composition 120A. After preparing the fat composition 120A, the fat composition 120 is then pumped through jacketed piping 150A to temperature controlled chute 160A. Liquid fat composition 120A is typically maintained at a temperature ranging from about 100° F. to about 170° F. At temperature controlled chute 160A, liquid fat composition 120A is applied to the outer surface 210A of flaking roll 180A in the form of a thin coating. The coating is typically applied at a thickness of about 0.5 mm to about 2.0 mm. During application of fat composition 120A, the flaking roll 180A is rotated about its axis 185A. Cooling is supplied to the flaking roll 180A to cool fat composition 120A as it is in contact with the outer surface 210A of flaking roll 180A. As flaking roll 180A rotates about its axis 185A, fat composition 120A cools to a temperature below its melting point and solidifies on the outer surface 210A of flaking roll 180A. After it is solidified, fat composition 120A is scraped from the outer surface 210A of flaking roll 180A by scraping blade 220A positioned in contact with the outer surface 210A of flaking roll 180A. Scraping blade 220A causes solidified fat composition 120A to be dislodged from the outer surface of flaking roll 210A in the form of thin sheets or flakes 230A. The flakes 230A are then collected as the fat particles.

Figure 6B:
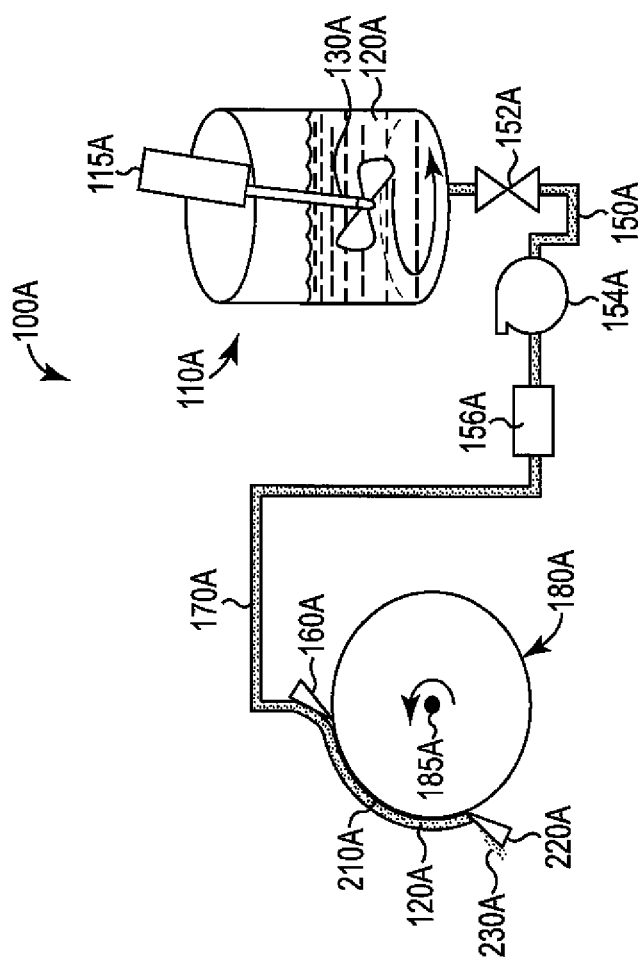

Still referring to FIGS. 6A and 6B, the fat particles that are produced can be as shown at either of FIG. 1A or 1B, containing solid particles of flavorant salt dispersed throughout the fat particles (FIG. 1A), or located at a high concentration at a surface (FIG. 1B). To produce fat particles containing solid particles of flavorant salt dispersed throughout the fat particles (FIG. 1A), the particles of flavorant salt can be dispersed throughout liquid fat composition 120A before liquid fat composition is solidified. For example, particles of flavorant salt can be dispersed within liquid fat composition 120A as early as at reservoir 110A.

To produce fat particles containing solid particles of flavorant salt located at a high concentration at a surface (FIG. 1B), the flavorant salt particles can be topically applied to a surface of liquid fat composition 120A prior to solidification. For example, fat composition 120A will not contain dispersed flavorant salt particles, but will be pumped through apparatus 100A as a liquid, including at the locations of temperature controlled chute 160A and access 170A to temperature controlled chute 160A. At a desired location before liquid fat composition 120A is solidified at flaking roll 180A, solid particles of flavorant salt can be applied topically to liquid fat composition 120A, such as access 170A to or at temperature controlled chute 160A. The solid particles will remain at or near the surface of liquid fat composition 120A as it proceeds to be solidified at flaking roll 180A. Flakes and fat particles prepared in this manner will include particles of flavorant salt located at a high concentration at one surface of the flakes and fat particles as shown at FIG. 1B.

Alternately, the fat particles may be as illustrated at FIG. 1C, containing dispersed water droplets that contain dissolved flavorant salt in the water droplets. To produce fat particles containing dispersed water droplets that contain dissolved flavorant salt as in FIG. 1C, the water droplets that contain dissolved flavorant salt can be dispersed throughout liquid fat composition 120A before liquid fat composition 120A is solidified. The water droplets must be stable within liquid fat composition 120A during processing, and also during solidification and flaking. As an example, water droplets containing dissolved flavorant salt can be dispersed within liquid fat composition 120A as early as at reservoir 110A. The stable droplets can remain part of liquid fat composition 120A throughout the illustrated process, up to and including solidification at flaking roll 180A, at which time fat composition 120A solidifies with dispersed water droplets (which contain dissolved flavorant salt) suspended in the solid fat of the fat particles.

Fat particle dimensions may be controlled, for example, by factors such as the depth of the shortening composition 120A in the trough (not shown), the fat composition temperature at the point of deposit, the surface temperature of the rotating drum (alternately a belt), and the rotation speed of the drum. For example, in many embodiments, fat composition 120A can be deposited at a temperature ranging from about 100° F. to about 150° F., more typically ranging from about 100° F. to about 170° F. In many embodiments, the depth of the fat composition in the trough ranges from about 2 inches to about 4 inches. In many embodiments the surface temperature of the drum ranges from about 0° C. (32° F.) to about −10.0° C. (14° F.), more typically ranging from about −3.0° C. (26.6° F.) to about −5.0° C. (23° F.). The "trough" is at the top of the roll, directly under the deposit point. The depth of fat composition 120A can be controlled by (1) the rate of deposition of the liquid fat composition (grams/minute), and (2) the speed of the roll (meters/minute).

The fat particles and fat particle compositions can be used in a food product such as a raw dough composition. When used in a raw dough composition, the flavorant salt-containing fat particles can be combined with other dough ingredients and mixed to become suspended in a bulk dough that results from mixing the other dough ingredients. The bulk dough (or "dough matrix") refers to the dough composition or dough ingredients other than the flavorant salt-containing fat particles. The "dough composition" refers to all dough ingredients including the flavorant salt-containing fat particles and the ingredients of the bulk dough.

The bulk dough contains dough ingredients such as water, flour, leavening agent (e.g., chemical leavening agent, yeast, or a combination of these), sweetener, milk, and optionally additional ingredients that may or may not include additional flavorant salt, additional fat, and additional fat particles that do not contain flavorant salt. Any additional flavorant salt present in the dough composition that is part of the bulk dough and not contained in the flavorant salt-containing fat particles is referred to as "dough salt." Any additional fat that is present in the dough composition that is part of the bulk dough and not contained in the flavorant salt-containing fat particles is referred to as "dough fat."

The dough composition may be a developed dough composition or an under-developed dough composition. Representative dough compositions include biscuits, pizza crusts, pie crusts (e.g., pot pie crusts), cinnamon rolls, other sweet rolls, and various bread doughs. The dough compositions may include one or more types of flour, such as about 15 weight percent or greater flour based on the total weight of the dough composition (meaning all dough ingredients, including the flavorant salt-containing fat particles and the ingredients of the bulk dough composition). Wheat flour may be obtained commercially from such sources as ADM Milling; Bay State Milling Co.; Conagra Inc.; General Mills, Inc.; Horizon Milling, LLC; and Rohstein Corp.

A useful dough composition can include liquid components, for example, water, milk, eggs, and oil, or any combination of these. Water is present to provide desired rheology. Water may be added during processing in the form of ice, to control the dough temperature during processing; the amount of any such water used is included in the amount of liquid components. The precise amount of water depends on factors known to those skilled in the dough making art including, for example, whether the dough composition is a developed or under-developed composition. Water (from all sources) may be present in dough compositions of the invention in an amount of about 15 weight percent or greater. In developed compositions, the amount of water from all sources, for example, water, eggs, milk, etc. should not be so high that the dough composition becomes soft and cannot maintain its desired closed-cell structure including bubbles of carbon dioxide and water vapor. Also, the amount of water should not be so low that the dough composition is dry and has no ability to expand.

A combination of ingredients of a dough composition can also be dye, i.e., a "dry mix," in which case the dry mix can contain all ingredients of a dough other than water. The formulation of the dry mix can be the same as for a dough composition as described, adjusted to contain no water.

A dough composition can be caused to expand (i.e., leaven) by any leavening mechanism, such as by one or more of the effects of: entrapped gas, such as entrapped carbon dioxide, entrapped oxygen, or both; by action of chemical leavening agents; or by action of a biological agent such as a yeast. Thus, a leavening agent may be an entrapped gas, such as layers or cells (bubbles) that contain carbon dioxide, water vapor, or oxygen, etc.; any type of yeast (e.g., cake yeast, cream yeast, dry yeast, etc.); or a chemical leavening system (e.g., containing a basic chemical leavening agent and an acidic chemical leavening agent that react to form a leavening gas, such as carbon dioxide).

In some embodiments, a dough composition can be yeast-leavened. As used herein the term "yeast-leavened" refers to dough compositions that are leavened primarily due to the production of gaseous metabolites of yeast; chemical leavening agents may optionally be present but in minor amounts, preferably less than about 10 weight percent chemical leavening agent based on the total weight of yeast and chemical leavening agent, or may not be present at all. The yeast may be any suitable yeast known to those of skill in the art, for example, fresh cream/liquid yeast, fresh compressed yeast, active dry yeast, and instant yeast. In some embodiments, the yeast is fresh compressed yeast (e.g., in cake or crumbled form) comprising about 65 to about 75 weight percent water and about 25 to about 35 weight percent yeast. The amount of yeast in a dough composition can be an amount that will produce a desired volume of gaseous metabolites. Exemplary amounts of yeast ingredient used in a dough composition can be up to about 10 weight percent (measured on a wet basis, including water associated with a yeast ingredient) (e.g., about 2 to about 8 weight percent for developed dough compositions, and less than about 1 to about 5 weight percent for under-developed compositions).

In some embodiments a chemical leavening agent may be used in addition to or as an alternate to a yeast leavening agent. Acidic chemical leavening agents (or acid agents) that may be useful include those generally known in the dough and bread-making arts. Acidic agents may be relatively soluble within different temperature ranges and may be optionally encapsulated. Examples of acidic agents include sodium aluminum phosphate (SALP), sodium acid pyrophosphate (SAPP), monosodium phosphate, monocalcium phosphate monohydrate (MCP), anhydrous monocalcium phosphate (AMCP), dicalcium phosphate dehydrate (DCPD), glucono-delta-lactone (GDL), an others. Commercially available acidic chemical leavening agents include those sold under the trade designations "LEVN-LITE" (SALP); "PAN-O-LITE" (SALP+MCP); "STABIL-9" (SALP+AMPC); "PY-RAN" (AMCP); and "HT MCP" (MCP).

A dough composition may also include basic chemical-leavening agent, optionally encapsulated. Useful basic chemical leavening agents are known in the dough and bread-making arts, and include soda (i.e., sodium bicarbonate, $NaHCO_3$), potassium bicarbonate ($KHCO_3$), ammonium bicarbonate ($NaHCO_3$), etc. Encapsulating the basic chemical leavening agent provides separation between the basic agent and the bulk of the dough composition. If present, exemplary amounts of chemical leavening agent can be less than about 5 weight percent of a dough composition (e.g., less than about 3.5 weight percent or less than about 0.3 weight percent), although other amounts can also be useful depending on the dough formulation and desired baked dough properties.

A dough composition includes fat in the form of the flavorant salt-containing shortening particles, and optionally some amount of additional fat ("dough fat") in the form of additional fat particles (not containing flavorant salt), plastic fat, liquid fat (oil), or a combination of these different types of dough fat. The amount of fat present in a dough composition as part of the flavorant salt-containing fat particles, relative to the total amount of fat in the dough composition (total fat is the amount of fat contained in flavorant salt-containing fat particles, plus the fat of any plastic, liquid oil, or non-flavorant salt-containing fat particles that is part of the bulk dough (i.e., the "dough fat")), can be any relative amount. Exemplary relative amounts of fat from the flavorant salt-containing fat particles, per total fat in a dough composition, can be from about 20 to about 100 weight percent based on total weight fat of a dough composition, e.g., from about 70 to about 100 weight percent, or from about 90 to about 100 weight percent based on total weight fat.

As exemplary amounts, the amount of total fat in a dough composition (fat from the flavorant salt-containing shortening particles, plus any added dough fat) can be any useful amount based on the type of dough composition being prepared, with exemplary amounts being in a range from about 1 weight percent to about 40 weight percent, e.g., from about 4 weight percent to about 28 weight percent, or from about 8 weight percent to about 20 weight percent total fat, based on the total weight of the dough composition.

Amounts of flavorant salt-containing fat particles in a dough composition can be any useful amount based on the type of dough composition being prepared, such as from about 1 weight percent to about 40 weight percent, e.g., from about 4 weight percent to about 28 weight percent, or from about 8 weight percent to about 20 weight percent, based on the total weight of the dough composition.

The type and amount of "dough fat" are not particularly limited. Amounts in the range from about 0 to about 10 weight percent dough fat based on total weight of a dough composition, may be useful in combination with above-identified amounts of flavorant salt-containing shortening particles, but higher amounts may also be useful. The optional "dough fat" component may be derived from any source, such as vegetable, dairy and marine sources including butter oil or butterfat, soybean oil, corn oil, rapeseed or canola oil, copra oil, cottonseed oil, fish oil, safflower oil, olive oil, sunflower oil, peanut oil, palm oil, palm kernel oil, coconut oil, rice bran oil and other plant derived oils, such as vegetable or nut oils. Examples of shortenings include animal fats, such as lards, butter and hydrogenated vegetable oils, such as margarine. Mixtures of different fats may also be used as dough fat ingredients.

The dough composition includes any total amount of flavorant salt desired, meaning flavorant salt of the fat particles, plus any amount of dough salt (salt in the dough composition but not in the flavorant salt-containing fat particles). For certain doughs, the total amount of flavorant salt can be in a range from about 0.1 weight percent to about 10 weight percent flavorant salt based on the total weight of the dough composition, e.g., from about 0.2, about 0.3, or about 0.5 weight percent, to about 5 weight percent of the dough composition. The amount of flavorant salt present in the dough composition as part of the flavorant salt-containing fat particles, relative to the total amount of flavorant salt (flavorant salt present in the flavorant salt-containing fat particles, plus any added flavorant salt present in the bulk dough ("dough salt")), can be any relative amount. Exemplary relative amounts of flavorant salt in flavorant salt-containing fat particles, per total flavorant salt in a dough composition, can be any amount up to 100 weight percent based on total weight flavorant salt of a dough composition, e.g., from about 20 or 25 to about 95 weight percent, or from about 30, 40, 50, 60, or 70 to about 90 weight percent based on total weight flavorant salt.

The dough composition may optionally include one or more sweeteners, natural or artificial, liquid or dry. If a liquid sweetener is used, the amount of other liquid components may be adjusted accordingly. Examples of suitable dry sweeteners include lactose, sucrose, fructose, dextrose, maltose, corresponding sugar alcohols, and mixtures thereof. Examples of suitable liquid sweeteners include high fructose corn syrup, malt, and hydrolyzed corn syrup. Often, dough compositions include up to about 8 weight percent sweetener. The dough composition may optionally include additional flavorings, for example whey; malt; yeast extract; inactivated yeast; spices; vanilla; natural and artificial flavors; etc.; as is known in the dough product arts. The additional flavoring can be included in an amount in the range from about 0.1 weight percent to about 10 weight percent of the dough composition, e.g., from about 0.2 weight percent to about 5 weight percent of the dough composition.

The dough composition may optionally include particulates, such as raisins, currants, fruit pieces, nuts, seeds, vegetable pieces, and the like, in suitable amounts. The dough composition may optionally include other additives, colorings, and processing aids, for example, gliadin (e.g., less than about 1 weight percent to improve extensibility (such as measured by a Brabender Extensograph) in under-developed dough), emulsifiers include lecithin, diglycerides, polyglycerol esters, and the like, (e.g., diacetylated tartaric esters of monoglyceride (DATEM) and sodium stearoyl lactylate (SSL)).

Fat particles as described can be useful in any dough composition or dough product, especially including dough compositions sometimes referred to as "non-laminated" doughs, which means raw dough compositions that contain a bulk dough as described, and that contain fat particles distributed (either homogeneously or non-homogeneously) within the bulk dough composition, and that do not contain multiple alternating layers of dough and fat, as would a laminated dough made by multiple steps of folding and sheeting the dough composition and a fat. Examples of formulations of raw dough compositions that can be prepared as generally described herein, by use of the flavorant salt-containing fat particles, include the following. In each of these, the "Shortening" ingredient means total fat, including any fat present as part of flavorant salt-containing fat particles, plus any dough fat. Similarly, the "salt" ingredient means total flavorant salt, including any flavorant salt that is present as part of flavorant salt-containing fat particles, plus any dough salt.

Biscuit Formula:

|  | Formulation (weight %) | |
|---|---|---|
| Ingredient | Preferred | Working |
| Flour | 40-50 | 20-55 |
| Liquid (Water/milk/buttermilk) | 25-35 | 20-40 |
| Sugar | 1-3 | 0-5 |
| Leavening agents | 2-4 | 1-5 |
| Emulsifier | 0.5-1 | 0-2 |
| Protein supplements (wheat, milk, soy) | 2-3 | 0-5 |
| Starches | 0-3 | 0-20 |
| Hydrocolloid | 0-3 | 0-5 |
| Flavor | 0.05-0.5 | 0-3 |
| Shortening (fat) | 8-20 | 6-28 |
| Flavorant salt | 0.5-1.5 | 0.1-4 |

This Biscuit formula included fat particles that contain flavorant salt (sodium chloride) in an amount in the range from about 2 to about 25 weight percent flavorant salt based on the weight of the fat particles.

Biscuit Mix Formula Example:

|  | Formulation (weight %) | |
|---|---|---|
| Ingredient | Preferred | Working |
| Flour | 60-85 | 50-85 |
| Sugar | 1-3 | 0-5 |
| Leavening agents | 3-4.5 | 1-6 |
| Protein supplements (wheat, milk, soy) | 0.2-2 | 0-5 |
| Shortening (fat) | 10-25 | 10-35 |
| Flavorant salt | 1-2.5 | 0.1-4 |

This Biscuit Mix formula can include fat in the form of plastic shortening and flavorant salt-containing fat particles that contain flavorant salt (sodium chloride) in an amount in the range from about 3.5 to about 20 weight percent flavorant salt based on the weight of the fat particles.

Pizza Crust Dough Formula Example:

|  | Formulation (weight %) | |
| --- | --- | --- |
| Ingredient | Preferred | Working |
| Flour | 50-65 | 50-75 |
| Water | 22-33 | 20-45 |
| Sugar or corn syrup | 0.5-1.5 | 0-4 |
| Yeast | 2-5 | 0.5-5 |
| Dough conditioner | 0.5-1.5 | 0-4 |
| Shortening (fat) | 2-6 | 1-8 |
| Flavorant salt | 0.5-2 | 0.1-3.5 |

This Pizza crust formula included fat particles that contain flavorant salt (sodium chloride) in an amount in the range from about 7 to about 50 weight percent flavorant salt based on the weight of the fat particles.

Pie Crust Formula Example:

|  | Formulation (weight %) | |
| --- | --- | --- |
|  | Preferred | Working |
| Flour | 40-50 | 35-55 |
| Liquid (Water/milk/buttermilk) | 15-25 | 15-25 |
| Sugar | 1-4 | 0.5-5 |
| Protein supplements | 0.2-0.8 | 0-2 |
| Shortening (fat) | 22-35 | 20-40 |
| Flavorant salt | 0.5-1.5 | 0.2-2 |

This Pie crust formula included fat particles that contain flavorant salt (sodium chloride) in an amount in the range from about 1 to about 7 weight percent flavorant salt based on the weight of the fat particles.

Sweet Roll Formula Example:

|  | Formulation (weight %) | |
| --- | --- | --- |
| Ingredient | Preferred | Working |
| Flour | 35-45 | 30-50 |
| Liquid (Water/milk/buttermilk) | 25-35 | 20-40 |
| Sugar/molasses/syrup | 6-15 | 5-20 |
| Leavening agents | 1-2.5 | 1-3 |
| Emulsifier | 0.5-1 | 0-2.5 |
| Protein supplements (wheat, milk, soy) | 0.5-2 | 0-5 |
| Starches | 0.1-1 | 0-3.5 |
| Shortening (fat) | 8-18 | 6-25 |
| Flavorant salt | 0.5-1.5 | 0.2-3 |

This Sweet roll formula included fat particles that contain flavorant salt (sodium chloride) in an amount in the range from about 2.5 to about 16 weight percent flavorant salt based on the weight of the fat particles.

Any of the above exemplary raw dough formulations can be prepared as "dry mix" compositions, by eliminating water and other liquid ingredients. Exemplary Working and Preferred Ranges of the ingredients can remain as stated relative to the composition that results upon combining the dry mix with the indicated amount of liquid ingredient.

In the above exemplary raw dough formulations, the amount of flavorant salt present in fat particles can differ based on the amount of fat particles (part of the "shortening" ingredient) in a dough and the desired amount of flavorant salt in the dough. For example, for a dough that contains from about 7 to about 20 (e.g., about 13) percent by weight fat particles (as part of the "shortening"), amounts of flavorant salt in a fat particle that may be useful or preferred can be from about 1 to about 8 weight percent flavorant salt based on the total weight of the fat particle, e.g., from 2 to 6, or from about 3 to about 5.

For the various exemplary formulations, the relative amount of flavorant salt in the fat particle compared to the total amount of flavorant salt in the dough composition can be any desired amount, such as at least 20 percent by weight (flavorant salt in the fat particles per total flavorant salt in the dough composition).

The embodiments of the invention described herein are not intended to be exhaustive or to limit the invention to the precise forms disclosed in the following detailed description. Rather, the embodiments are chosen and described so that others skilled in the art can appreciate and understand the principles and practices of the invention.

The following examples show a salt concentration gradient in a baked dough product, here a biscuit.

Sample Preparation

The top and bottom surfaces of baked biscuits were removed using an electric serrated knife to cut as thin a section as possible (~¼ in). This is repeated for 3 biscuits per variable.

Test Method

Sodium concentration was measured separately in each of the 3 biscuit sections (top, middle, and bottom) using AOAC Official Method of Analysis 985.01. To identify a concentration of (sodium chloride) flavorant salt, the sodium concentration was adjusted to account for the presence of leavening salts such as SALP and SAPP.

Results

|  | Salt Concentration (mMol/100 g) at Each Biscuit Section | | |
| --- | --- | --- | --- |
|  | Bottom Section | Middle Section | Top Section |
| Control: biscuit with 50% salt evenly mixed in dough | 13.4 | 12.7 | 13.4 |
| Invention: biscuit with 50% salt delivered by fat particles | 17.5 | 10.6 | 14.6 |

|  | Salt Gradient as Compared to Middle section | | |
| --- | --- | --- | --- |
|  | Bottom Section | Middle Section | Top Section |
| Control: biscuit with 50% salt evenly mixed in dough | 106% | 100% | 106% |
| Invention: biscuit with 50% salt delivered by fat particles | 165% | 100% | 137% |

The results indicate a significant increase in salt concentration of the top and bottom sections of cooked dough products (biscuits) of the invention relative to the middle section of the biscuit, as well as compared to the Control and 50% Salt in Dough variables.

The invention claimed is:

1. A dough composition comprising flour, water, fat, and flavorant salt, the dough composition comprising fat particles, the fat particles being anhydrous and consisting of solid fat and flavorant salt, the flavorant salt in the fat particles being in particle form and having a bulk density less than about 70 pounds per cubic foot or having a mean particle size in a range from about 1 to 100 micrometers, wherein the amount of flavorant salt in the fat particles is at least 20 percent of a total amount of flavorant salt in the dough composition.

2. A dough composition according to claim 1 wherein the fat particles consist of
from 50 to 99 weight percent solid fat, and
from 1 to 50 weight percent flavorant salt,
based on total weight fat particles.

3. A dough composition according to claim 1, wherein the flavorant salt is selected from the group consisting of: sodium chloride, potassium chloride, monosodium glutamate, *S. herbacea* (saltwort), *L. japonica* (sea tangle), and *L. chinensis* (kukoshi), and combinations thereof.

4. A dough composition according to claim 1 wherein the fat particles have from about 1 to about 8 weight percent flavorant salt based on total weight fat particles.

5. A dough composition according to claim 1 wherein the solid fat is a fat ingredient selected from the group consisting of: base oil, interesterified base oil, fractionated base oil, fully hydrogenated base oil, partially hydrogenated base oil, and mixtures thereof.

6. A dough composition according to claim 1 wherein the solid fat is a fat ingredient selected from the group consisting of:
base oil selected from the group consisting of natural or genetically modified soybean oil, corn oil, canola oil, copra oil, cottonseed oil, peanut oil, safflower oil, olive oil, sunflower oil, peanut oil, palm oil, palm kernel oil, coconut oil, rice bran oil, rapeseed oil and other vegetable nut/seed oils, butter, lard, tallow, fish oil,
interesterified base oil,
fractionated base oil,
partially hydrogenated base oil,
fully hydrogenated base oil,
and mixtures thereof.

7. A dough composition according to claim 1 wherein the solid fat includes a base oil that is selected from the group consisting of canola oil, soy oil, and combinations thereof.

8. A dough composition according to claim 1 wherein the solid fat consists essentially of non-tropical base oil fat ingredients.

9. A dough composition according to claim 1 wherein the flavorant salt is in the form of flavorant salt particles distributed uniformly throughout the solid fat.

10. A dough composition according to claim 1 wherein the flavorant salt is in the form of flavorant salt particles distributed non-uniformly within the solid fat and at a surface of the fat particles.

11. A dough composition according to claim 1, comprising:
from about 20 to 55 weight percent flour,
from about 1 to about 40 weight percent fat,
from about 15 to about 45 weight percent water,
from about 0.1 to about 5 weight percent flavorant salt,
based on total weight dough composition,
wherein the amount of fat includes fat of the fat particles and dough fat, and the amount of flavorant salt includes flavorant salt of the fat particles and dough salt.

12. A dough composition according to claim 11 comprising from about 4 to about 28 weight percent fat based on total weight dough composition.

13. A dough composition according to claim 11 comprising from about 1 to about 40 weight percent fat particles based on total weight dough composition.

14. A dough composition according to claim 1 comprising from about 4 to about 28 weight percent fat particles based on total weight dough composition.

15. A dough composition according to claim 1 wherein fat particles exhibit a thickness dimension in a range from about 0.020 to about 0.100 inches, one more dimension that is at least 0.2 inch, and optionally a third dimension that is at least 0.2 inch.

* * * * *